(12) United States Patent
Lee

(10) Patent No.: US 7,831,285 B2
(45) Date of Patent: Nov. 9, 2010

(54) SLIDER ASSEMBLY FOR SLIDING-TYPE MOBILE PHONE AND CELLULAR PHONE HAVING THE SLIDER ASSEMBLY

(75) Inventor: Jang-Woo Lee, Suwon-si (KR)

(73) Assignee: Hitech Parts Co., Ltd. (KR)

( * ) Notice: Subject to any disclaimer, the term of this patent is extended or adjusted under 35 U.S.C. 154(b) by 882 days.

(21) Appl. No.: 11/650,641

(22) Filed: Jan. 8, 2007

(65) Prior Publication Data
US 2007/0155451 A1 Jul. 5, 2007

Related U.S. Application Data

(63) Continuation of application No. PCT/KR2005/002046, filed on Jun. 29, 2005.

(30) Foreign Application Priority Data

| Mar. 8, 2004 | (KR) | ................. 20-2005-0006264 U |
| Jul. 8, 2004 | (KR) | ................. 20-2004-0019437 U |
| Dec. 2, 2004 | (KR) | ................. 20-2004-0034247 U |
| Mar. 18, 2005 | (KR) | ................. 20-2005-0007326 U |
| Mar. 23, 2005 | (KR) | ................. 20-2005-0007928 U |

(51) Int. Cl.
*H04M 1/00* (2006.01)
(52) U.S. Cl. .............. 455/575.4; 455/575.1; 455/575.3; 455/550.1; 345/169; 361/679.56
(58) Field of Classification Search .............. 455/575.3, 455/575.4, 575.1
See application file for complete search history.

(56) References Cited

U.S. PATENT DOCUMENTS

| 6,073,027 | A | 6/2000 | Norman et al. |
| 6,282,436 | B1 | 8/2001 | Crisp |
| 2003/0064688 | A1 | 4/2003 | Mizuta et al. |
| 2006/0180457 | A1 | 8/2006 | Han et al. |
| 2008/0254844 | A1 | 10/2008 | Lee |
| 2009/0168339 | A1 | 7/2009 | Lee |

FOREIGN PATENT DOCUMENTS

JP         02-204139 A         8/1990

(Continued)

OTHER PUBLICATIONS

Office Action Dated Mar. 17, 2009 of Corresponding Japanese Patent Application No. 2007-520222—3 Pages.
International Search Report Dated Oct. 25, 2005 in PCT Application PCT/KR2005/002046, Which is the Parent Application—2 Pages.
Office Action dated Dec. 8, 2009 of corresponding Japanese Patent Application No. 2007-520222—2 pages.

*Primary Examiner*—Patrick N Edouard
*Assistant Examiner*—Chuck Huynh
(74) *Attorney, Agent, or Firm*—Knobbe Martens Olson & Bear, LLP

(57) ABSTRACT

Disclosed is a slider assembly for a sliding-type cellular phone. The slider assembly includes a fixing plate formed with a guide section for guiding a linear motion of a sliding plate and fixed to an surface of a main body of the sliding-type cellular phone, a sliding plate guided linearly by the guide section of the fixing plate and fixed to an opposite surface of a cover of the cellular phone, and an up/down positioning member having one end hinged to the fixing plate and the other end hinged to the sliding plate to change a direction of an urging force for pushing the sliding plate from a specific sliding location of the sliding plate. The up/down positioning member includes a first link slider having one end slidably fixed to the fixing plate, a second link slider having one end fixed to the sliding plate and restricted with respect to the first link slider to be slid in a longitudinal direction of the first link slider, a tension spring having both ends fixed to opposite ends of the first and second link sliders, and a restriction member for restricting a sliding length of the sliding plate while guiding a sliding motion of the first and second link sliders.

24 Claims, 26 Drawing Sheets

FOREIGN PATENT DOCUMENTS

| | | |
|---|---|---|
| JP | 05-244238 A | 9/1993 |
| JP | 08-097891 A | 4/1996 |
| JP | 08-101438 A | 4/1996 |
| JP | 2001-122031 A | 5/2001 |
| JP | 2003-125052 | 4/2003 |
| KR | 20-0308165 Y1 | 3/2003 |
| KR | 20-0319967 * | 7/2003 |
| KR | 20-0319967 Y1 | 7/2003 |
| KR | 1020030090549 A | 11/2003 |
| KR | 20-0350760 Y1 | 6/2004 |
| KR | 20-0382520 Y1 | 4/2005 |
| KR | 20-0396258 Y1 | 9/2005 |

* cited by examiner (a)

(b)

(c)

(a)

(b)

(c)

SLIDER ASSEMBLY FOR SLIDING-TYPE MOBILE PHONE AND CELLULAR PHONE HAVING THE SLIDER ASSEMBLY

CROSS-REFERENCE TO RELATED PATENT APPLICATIONS

This application is a continuation application under 35 U.S.C. §365(c) of International Application No. PCT/KR2005/002046, filed Jun. 29, 2005 designating the United States. International Application No. PCT/KR2005/002046 was published in English as WO2006/006776 A1 on Jan. 19, 2006. This application further claims the benefit of the earlier filing dates under 35 U.S.C. §365(b) of Korean Utility Model Application Nos. 20-2004-0019437 filed Jul. 8, 2004, 20-2004-0034247 filed Dec. 2, 2004, 20-2005-0006264 filed Mar. 8, 2004, 20-2005-0007326 filed Mar. 18, 2005 and 20-2005-0007928 filed Mar. 23, 2005. This application incorporates herein by reference the International Application No. PCT/KR2005/002046 including the International Publication No. WO2006/006776 A1 and the Korean Utility Model Application Nos. 20-2004-0019437, 20-2004-0034247, 20-2005-0006264, 20-2005-0007326 and 20-2005-0007928 in their entirety.

BACKGROUND

1. Field of the Invention

The present invention relates to a slider assembly, and more particularly, to a slider assembly for use in a cellular phone.

2. Discussion of Related Technology

As shown in FIG. 25, a sliding-type cellular phone comprises a main body 1 on which a plurality of keys 3 are installed and a cover 2 installed slidably over a surface of the main body 1 on which the keys 3 are installed. A liquid crystal display 4 is installed on a front surface of the cover 2. In the sliding-type cellular phone as described above, a slider assembly 100 shown in FIG. 25 or 26 is installed between the main body 1 and the cover 2 to allow the cover 2 to be slid with respect to the main body 1.

The slider assembly shown in FIG. 25 comprises a fixing plate 110 fixed to the main body 1; a sliding plate 170 fixed to a surface of the cover facing the main body; and an up/down positioning means 140 which includes one end hinged to the fixing plate 110 and the other end hinged to the sliding plate 120 to impart an elastic force to the cover 2 in a direction in which the cover is closed or opened with respect to a certain sliding point. The up/down positioning means includes a cylinder 141 in which a compression spring is received and a rod 142 which is installed to be movably received in the cylinder 141 while pushing the compression spring. As shown in the figure, an end of the cylinder 141 is hinged to the fixing plate 110, and an opposite end of the rod 142 is hinged to the sliding plate 120.

Another type of exemplary slider assembly 100 is illustrated in FIG. 26. The slider assembly 100 shown in FIG. 26 includes a fixing plate 110 fixed to the main body 1; a sliding plate 120 fixed to a surface of the cover facing the main body; and a pair of torsion springs 130 each having an end hinged to the fixing plate 110 and the other end hinged to the sliding plate. In the slider assembly shown in FIG. 26, the pair of torsion springs 130 are equivalent to the up/down positioning means.

The exemplary slider assembly as described above does not include a function of restricting a sliding length of the sliding plate 120. Accordingly, in order to adjust the upward/downward sliding stroke of the sliding plate 120, a stopper (not shown) for restricting the movement of the sliding plate is installed at the main body or cover of the cellular phone. Further, as shown in FIG. 25, separate dampers 150 for absorbing the shock may be installed at both ends of the sliding plate that collides against the stopper when the cover of the cellular phone is slid. Therefore, a process for manufacturing the cellular phone is complicated, and thus, the production costs are increased. Meanwhile, the slider assembly of FIG. 25 is superior to the slider assembly of FIG. 26 using the torsion springs in view of their durability, but the former is more complicated and expensive than the latter because the spring and rod 142 is received and assembled in the cylinder 141 and the ends of the cylinder and rod is hingedly coupled to the fixing plate and the sliding plate, respectively.

The slider assembly of in FIG. 26 employs the torsion spring 130 as the up/down positioning means, and thus, the slide assembly can be manufactured through a simple process and at a low cost. However, since it is difficult to manufacture the torsion spring with constant elasticity, every cellular phone cannot have a constant urging force required for sliding the cover. Accordingly, there is a problem that the cellular phones with the uniform urging force required for sliding the cover cannot be manufactured. Further, if the torsion spring 130 is repeatedly used for a long time, excessive deformation is generated at a portion that connects linear and curved portions of the torsion spring 130, and thus, the connecting portion is broken due to fatigue. Consequently, there is another problem in that a durability of the torsion spring is not good.

The discussion in this section is to provide general background information, and does not constitute an admission of prior art.

SUMMARY

An aspect of the present invention is to provide a slider assembly which can restrict a sliding length of a sliding plate by means of an up/down positioning means thereof without need to install additional stoppers on a main body or cover of a cellular phone.

Another aspect of the present invention is to provide a slider assembly which uses a tension spring, as an elastic means for maintaining an up/down state of a sliding plate, instead of a torsion spring to improve its durability.

A further aspect of the present invention is to provide a slider assembly in which a guide bush with a low coefficient of friction is installed in a guide groove of a sliding plate to prevent the guide groove of the sliding plate and a guide section of a fixing plate from being brought into direct contact with each other, whereby the durability can be improved and sliding noise can be reduced.

A still further aspect of the present invention is to provide a slider assembly including a spring engaging section that is deformed to prevent an up/down positioning means from interfering with a flexible printed circuit board when the up/down positioning means is operated.

A still further aspect of the present invention is to provide a slider assembly including a fixing plate and a sliding plate which are manufactured through the press working to save the production costs such that there is no need for additional machining processes for the next assembly.

A still further aspect of the present invention is to provide a slider assembly in which a sliding plate is arranged such that an amount of deformation of a spring is minimized when the sliding plate is slid up and down, whereby the expected life span of the spring can be prolonged.

A still further aspect of the present invention is to provide a slider assembly of which respective plates are made from stainless steel such that the slider assembly cannot be easily damaged from shock.

A still further aspect of the present invention is to provide a slider assembly in which a guide bush with a low coefficient of friction is installed to a guide section of a fixing plate to prevent the guide section of the fixing plate and a wing section of a sliding plate from being brought into direct contact with each other, whereby the durability can be improved and noise can be reduced when the sliding plate is slid.

A still further aspect of the present invention is to provide a slider assembly in which a shock-absorbing member made of a soft material is installed at both ends of a guide bush installed at a fixing groove of a fixing plate such that the guide bush can be prevented from being damaged due to shock generated when a cover of the cellular phone is opened or closed or when the cellular phone is dropped.

A still further aspect of the present invention is to provide a slider assembly in which noise cannot be generated by installing a shock-absorbing member to further protrude from both ends of a fixing plate such that a cover of the cellular phone with a sliding plate installed thereon is brought into contact with the shock-absorbing member rather than the fixing plate even though the cover of the cellular phone is frequently slid.

A still further aspect of the present invention is to provide a slider assembly in which a cover of a cellular phone can be firmly kept at its up or down state by installing a plurality of permanent magnets at predetermined positions on both ends of the fixing plate and sliding plate such that a certain repulsive or attractive force can be exerted thereto even though an elastic restoring force of a spring becomes weak due to repeated use for a long time.

A still further aspect of the present invention is to provide a slider assembly in which a sliding plate can be slid smoothly and continuously even in a dead zone by further installing permanent magnets at one end of the sliding plate such that a repulsive or attractive force can be generated between the magnets installed on the fixing and sliding plates.

A still further aspect of the present invention is to provide a sliding-type cellular phone comprising the slider assembly so configured.

According to an aspect of the present invention, there is provided a slider assembly for a sliding type cellular phone, which comprises a fixing plate formed with a guide section for guiding a linear motion of a sliding plate and fixed to an surface of a main body of the sliding-type cellular phone, a sliding plate guided linearly by the guide section of the fixing plate and fixed to an opposite surface of a cover of the cellular phone, and an up/down positioning means having one end hinged to the fixing plate and the other end hinged to the sliding plate to change a direction of an urging force for pushing the sliding plate from a specific sliding location of the sliding plate, wherein the guide section of the fixing plate includes a pair of opposite and parallel fixing grooves, each formed by bending twice a side portion of the fixing plate, and a pair of guide bushes fitted and installed in the fixing grooves, respectively, each guide bush having a guide groove for receiving a side of the sliding plate and guiding a sliding motion of the sliding plate, and the sliding plate includes a pair of wing sections formed by bending both sides thereof, each wing section is inserted in the guide groove of the corresponding guide bush to be linearly slid along the guide groove.

The slider assembly may further comprise dampers made of a material softer than the guide bush and installed at both longitudinal ends of the guide bush to protrude from a longitudinal end of the fixing plate for absorbing shock generated due to collision against the sliding plate fixed to the cover of the cellular phone.

Preferably, a plurality of through holes are formed on a bent side of each fixing groove of the guide section, and protrusions are formed on surfaces of the guide bush and damper facing the fixing groove of the guide section are inserted and fixed in the through holes. Preferably, the guide bushes are made of polyoxymethylene (POM) and the dampers are made of urethane rubber.

The slider assembly may further comprise a pair of first permanent magnets installed at both ends of the fixing plate, respectively, to face the sliding plate; and a pair of second permanent magnets fixedly installed at positions on the sliding plate where the sliding plate can be urged outward at an up or down position of the sliding plate due to repulsive or attractive forces generated between the second permanent magnets and the first permanent magnets installed at both ends of the fixing plate.

The slider assembly may further comprise third permanent magnets fixedly installed at positions on the sliding plate, near a position where a direction of the urging force of the up/down positioning means is changed while the sliding plate is moved, such that repulsive or attractive forces are generated between the third permanent magnets and any one pair of the first permanent magnets of the fixing plate.

Preferably, the up/down positioning means is a spring including one end pivotally fixed to the fixing plate and the other end pivotally fixed to the sliding plate. Alternatively, the up/down positioning means includes a first link slider having an end slidably fixed to the fixing plate, a second link slider having an end fixed to the sliding plate and restricted with respect to the first link slider to be slid in a longitudinal direction of the first link slider, a tension spring having both ends fixed to opposite ends of the first and second link sliders, and a restriction means for restricting a sliding length of the sliding plate while guiding a sliding motion of the first and second link sliders.

The slider assembly may further comprise a pair of first permanent magnets installed at both ends of the fixing plate, respectively, to face the sliding plate; and a pair of second permanent magnets fixedly installed at positions on the cover of the cellular phone such that the sliding plate is kept stationary at an up or down position due to an attractive force generated between the first and second permanent magnets.

The slider assembly may further comprise third permanent magnets fixedly installed at positions on the sliding plate, near a position where a direction of the urging force of the up/down positioning means is changed while the sliding plate is moved, such that repulsive or attractive forces are generated between the third permanent magnets and any one pair of the first permanent magnets of the fixing plate.

Preferably, the up/down positioning means is a spring including one end pivotally fixed to the fixing plate and the other end pivotally fixed to the sliding plate. Alternatively, the up/down positioning means includes a first link slider having an end slidably fixed to the fixing plate, a second link slider having an end fixed to the sliding plate and restricted with respect to the first link slider to be slid in a longitudinal direction of the first link slider, a tension spring having both ends fixed to opposite ends of the first and second link sliders, and a restriction means for restricting a sliding length of the sliding plate while guiding a sliding motion of the first and second link sliders.

According to another aspect of the present invention, there is provided a slider assembly for a sliding type cellular phone including a fixing plate formed with a guide section for guiding a linear motion of a sliding plate and fixed to an surface of a main body of the sliding-type cellular phone, a sliding plate guided linearly by the guide section of the fixing plate and fixed to an opposite surface of a cover of the cellular phone, and an up/down positioning means having one end hinged to the fixing plate and the other end hinged to the sliding plate to change a direction of an urging force for pushing the sliding plate from a specific sliding location of the sliding plate, wherein the up/down positioning means includes a first link slider having one end slidably fixed to the fixing plate, a second link slider having one end fixed to the sliding plate and restricted with respect to the first link slider to be slid in a longitudinal direction of the first link slider, a tension spring having both ends fixed to opposite ends of the first and second link sliders, and a restriction means for restricting a sliding length of the sliding plate while guiding a sliding motion of the first and second link sliders.

Preferably, the restriction means comprises a guide slot with a predetermined length formed in one of the first and second link sliders in a longitudinal direction of the link slider, and a guide protrusion fixed to the other link slider and received in the guide slot to guiding a sliding motion of the other link slider.

Preferably, the first and second link sliders have the same plate shape, the guide slot is formed through each link slider, the guide protrusion is a pin fixed to each link slider, and the pin has a head with a diameter greater than a width of the guide slot. Alternatively, the first and second link sliders have the same plate shape, the guide slot is formed through each link slider, the guide protrusion is a protrusion formed by partially cutting a portion of each link slider and bending the partially cut portion toward the corresponding guide slot, and the pin has a head with a diameter greater than a width of the guide slot.

Preferably, each of the link sliders has spring engaging sections formed at the other end thereof and protruding from both sides thereof perpendicular to a longitudinal direction of the link slider, and a pair of springs are installed between the corresponding spring engaging sections of the first and second link sliders.

The slider assembly may further comprises a pair of first permanent magnets installed at both ends of the fixing plate, respectively, to face the sliding plate; and a pair of second permanent magnets fixedly installed at positions on the sliding plate where the sliding plate can be urged outward at an up or down position of the sliding plate due to repulsive or attractive forces generated between the second permanent magnets and the first permanent magnets installed at both ends of the fixing plate.

The slider assembly may further comprise third permanent magnets fixedly installed at positions on the sliding plate, near a position where a direction of the urging force of the up/down positioning means is changed while the sliding plate is moved, such that repulsive or attractive forces are generated between the third permanent magnets and any one pair of the first permanent magnets of the fixing plate.

The slider assembly may further comprise a pair of first permanent magnets installed at both ends of the fixing plate, respectively, to face the sliding plate; and a pair of second permanent magnets fixedly installed at positions on the cover of the cellular phone such that the sliding plate is kept stationary at an up or down position due to an attractive force generated between the first and second permanent magnets.

The slider assembly may further comprise third permanent magnets fixedly installed at positions on the sliding plate, near a position where a direction of the urging force of the up/down positioning means is changed while the sliding plate is moved, such that repulsive or attractive forces are generated between the third permanent magnets and any one pair of the first permanent magnets of the fixing plate.

Preferably, the guide section of the fixing plate includes a pair of opposite and parallel fixing grooves, each formed by bending twice a side portion of the fixing plate, and a pair of guide bushes fitted and installed in the fixing grooves, respectively, each guide bush having a guide groove for receiving a side of the sliding plate and guiding a sliding motion of the sliding plate; and the sliding plate includes a pair of wing sections formed by bending both sides thereof, each wing section is inserted in the guide groove of the corresponding guide bush to be linearly slid along the guide groove.

The slider assembly may further comprise dampers made of a material softer than the guide bush and installed at both longitudinal ends of the guide bush to protrude from a longitudinal end of the fixing plate for absorbing shock generated due to collision against the sliding plate fixed to the cover of the cellular phone, wherein a plurality of through holes are formed on a bent side of each fixing groove of the guide section, and protrusions are formed on surfaces of the guide bush and damper facing the fixing groove of the guide section are inserted and fixed in the through holes. Preferably, the guide bushes are made of polyoxymethylene (POM) and the damper is made of urethane rubber.

According to a further aspect of the present invention, there is provided a sliding-type cellular phone which comprises a main body with a plurality of keys provided on a surface thereof, a cover slidably installed over the surface of the main body and having a crystal liquid display installed on a front surface thereof, and the foregoing slider assembly, the slider assembly fixedly installed between the main body and the cover, wherein the fixing plate of the slider assembly is fixedly installed at the main body, and the sliding plate of the slider assembly is installed at the cover.

DETAILED DESCRIPTION OF EMBODIMENTS

Hereinafter, various embodiments of the present invention will be described in detail with reference to the accompanying drawings.

Figure 1:
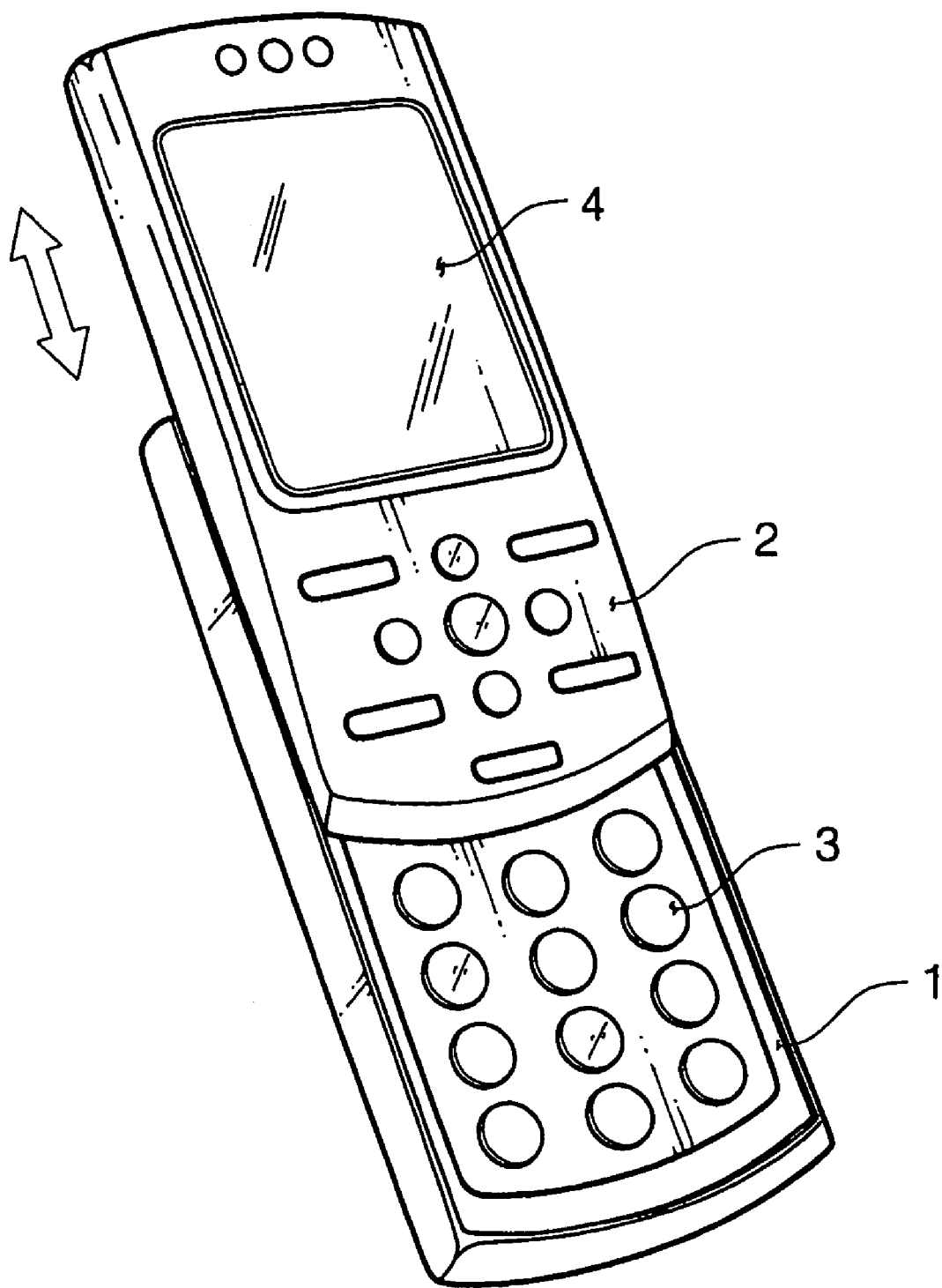
FIG. 1 is a perspective view of a cellular phone including a slider assembly for a sliding-type cellular phone according to an embodiment of the present invention.
Figure 2:
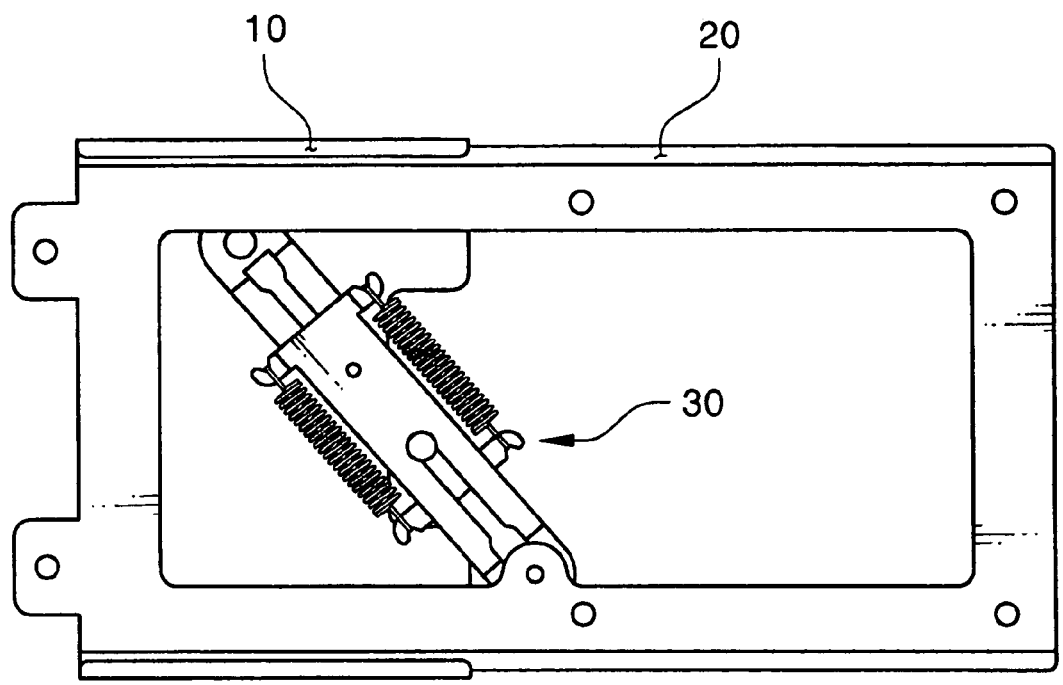
FIG. 2 is a plan view of a slider assembly for the sliding-type cellular phone according to a first embodiment of the present invention.
Figure 3:
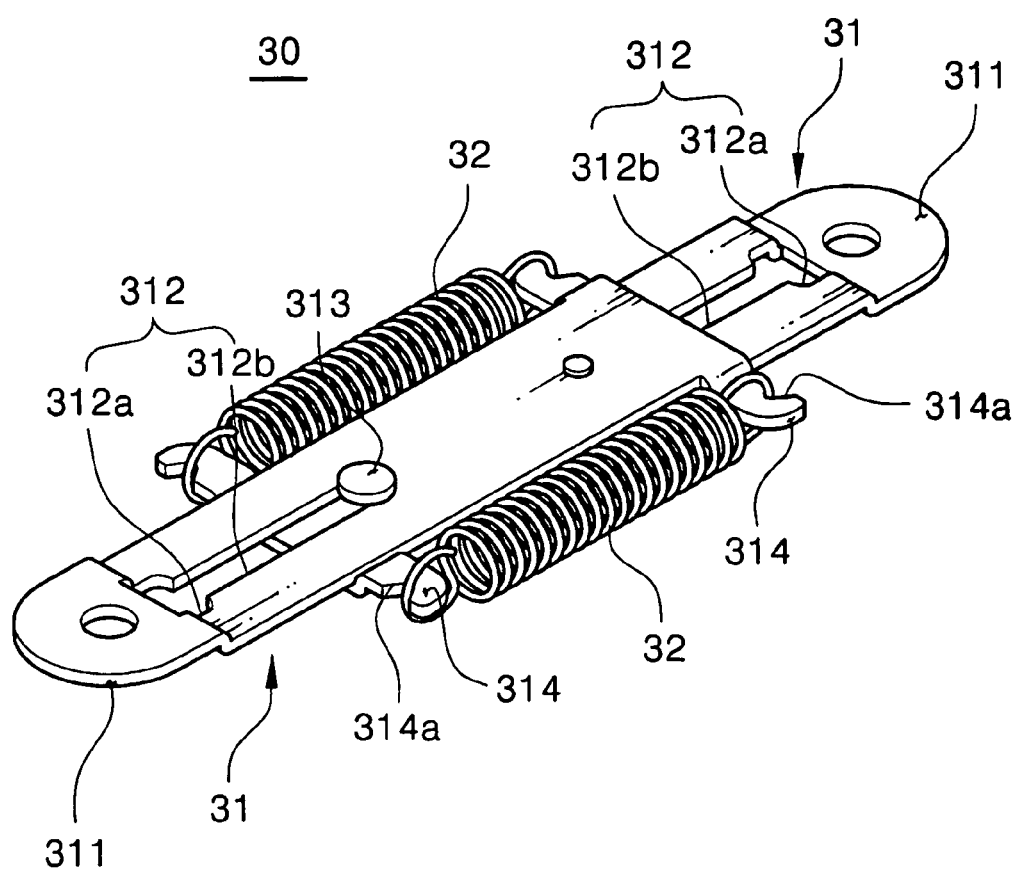
FIG. 3 is a perspective view of an up/down positioning means of the slider assembly according the first embodiment of the present invention.
Figure 4:
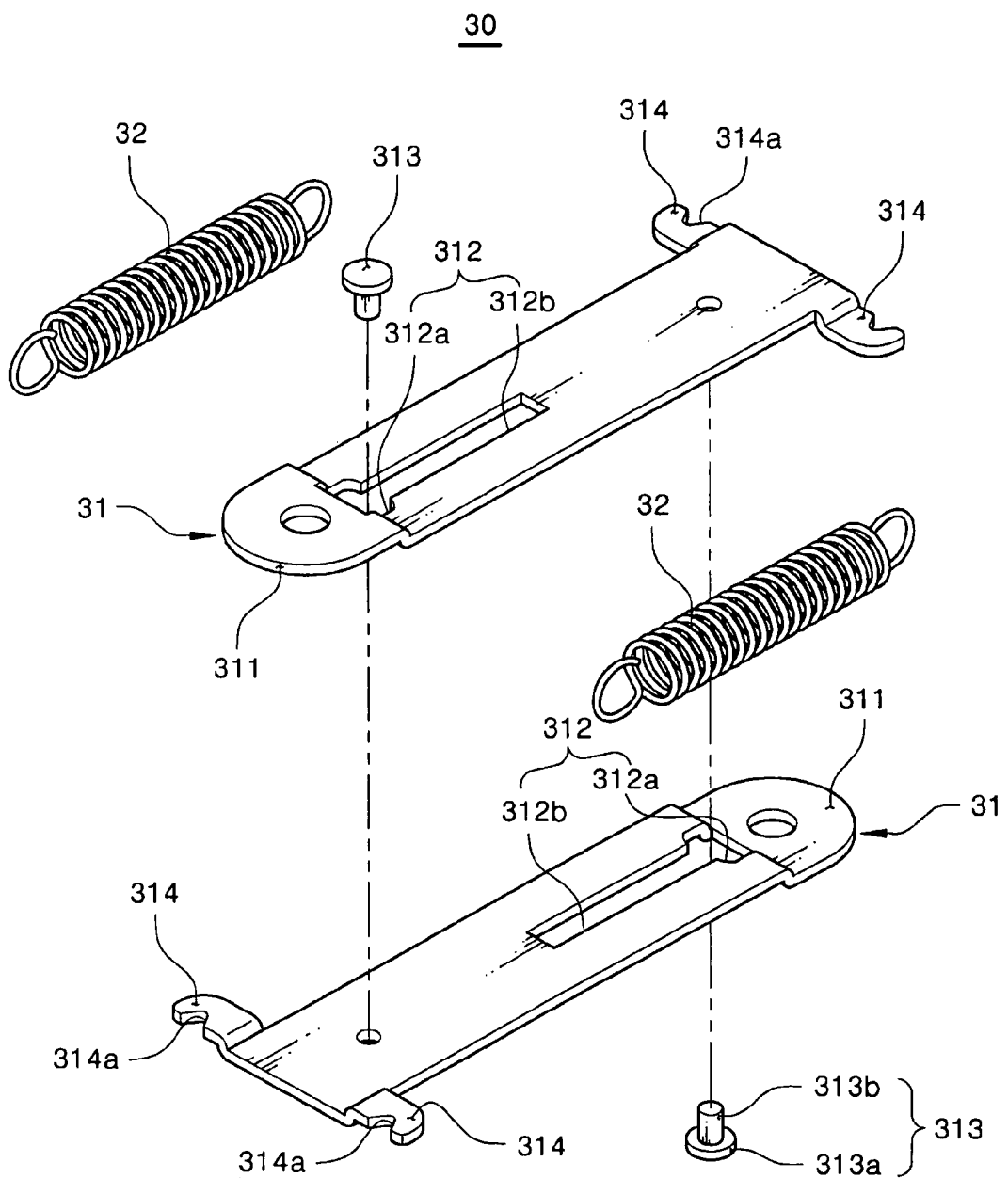
FIG. 4 is an exploded perspective view of the up/down positioning means shown in FIG. 3.
Figure 5:
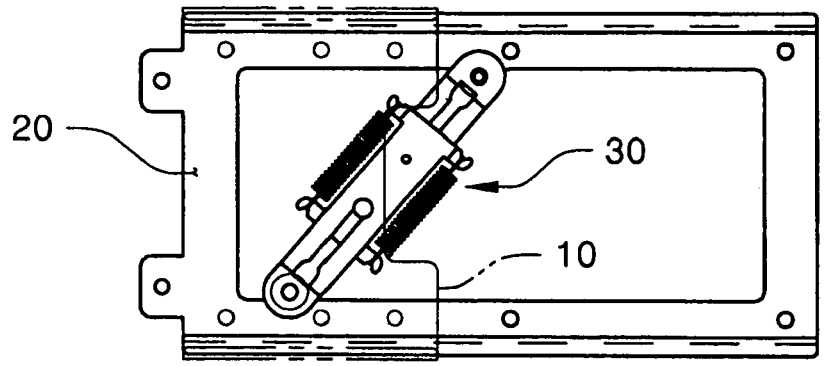
FIG. 5 (a) to (c) are views illustrating the operating state of the embodiment shown in FIG. 2.
Figure 5:
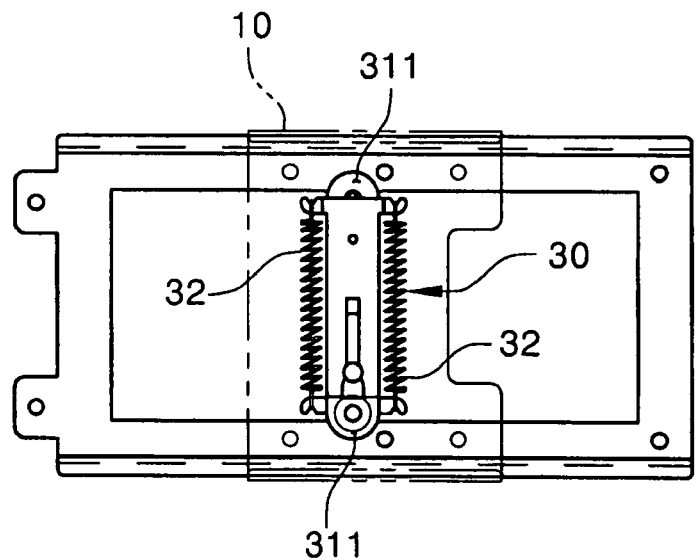
Figure 5:
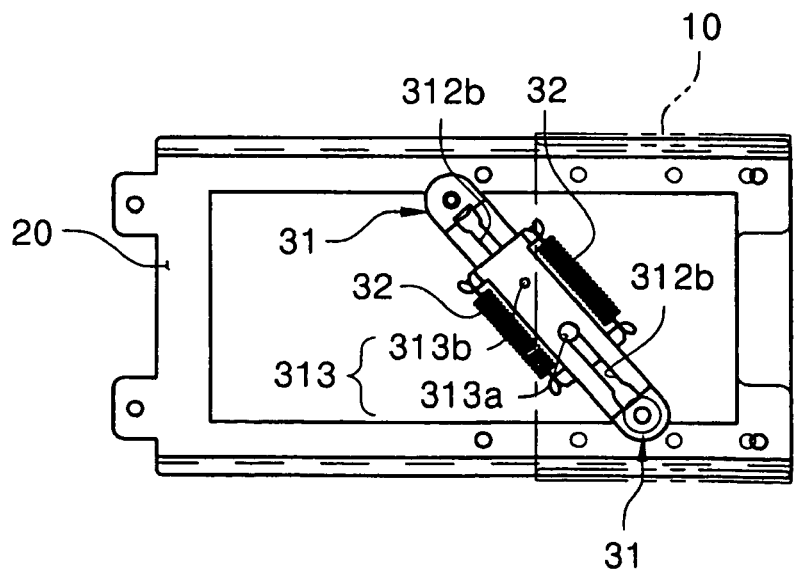

FIG. 1 is a perspective view of a cellular phone including a slider assembly for a sliding-type cellular phone according to an embodiment of the present invention, FIG. 2 is a plan view of a slider assembly for the sliding-type cellular phone according to a first embodiment of the present invention, FIG. 3 is a perspective view of an up/down positioning means of the slider assembly according the first embodiment of the present invention, FIG. 4 is an exploded perspective view of the up/down positioning means shown in FIG. 3, and FIG. 5 (*a*) to (*c*) are views illustrating the operating state of the embodiment shown in FIG. 2.

The sliding-type cellular phone of FIG. 1 comprises a main body 1 on which a plurality of keys 3 are installed, and a cover 2 installed slidably over a surface of the main body 1 on which the keys 3 are installed. A liquid crystal display 4 is installed on a front surface of the cover 2. In the sliding-type cellular phone as described above, a slider assembly 100 is installed between the main body 1 and the cover 2. In such a case, a fixing plate 10 is installed on the main body 1 and a sliding plate 20 is installed slidably on the cover 2.

Figure 26:
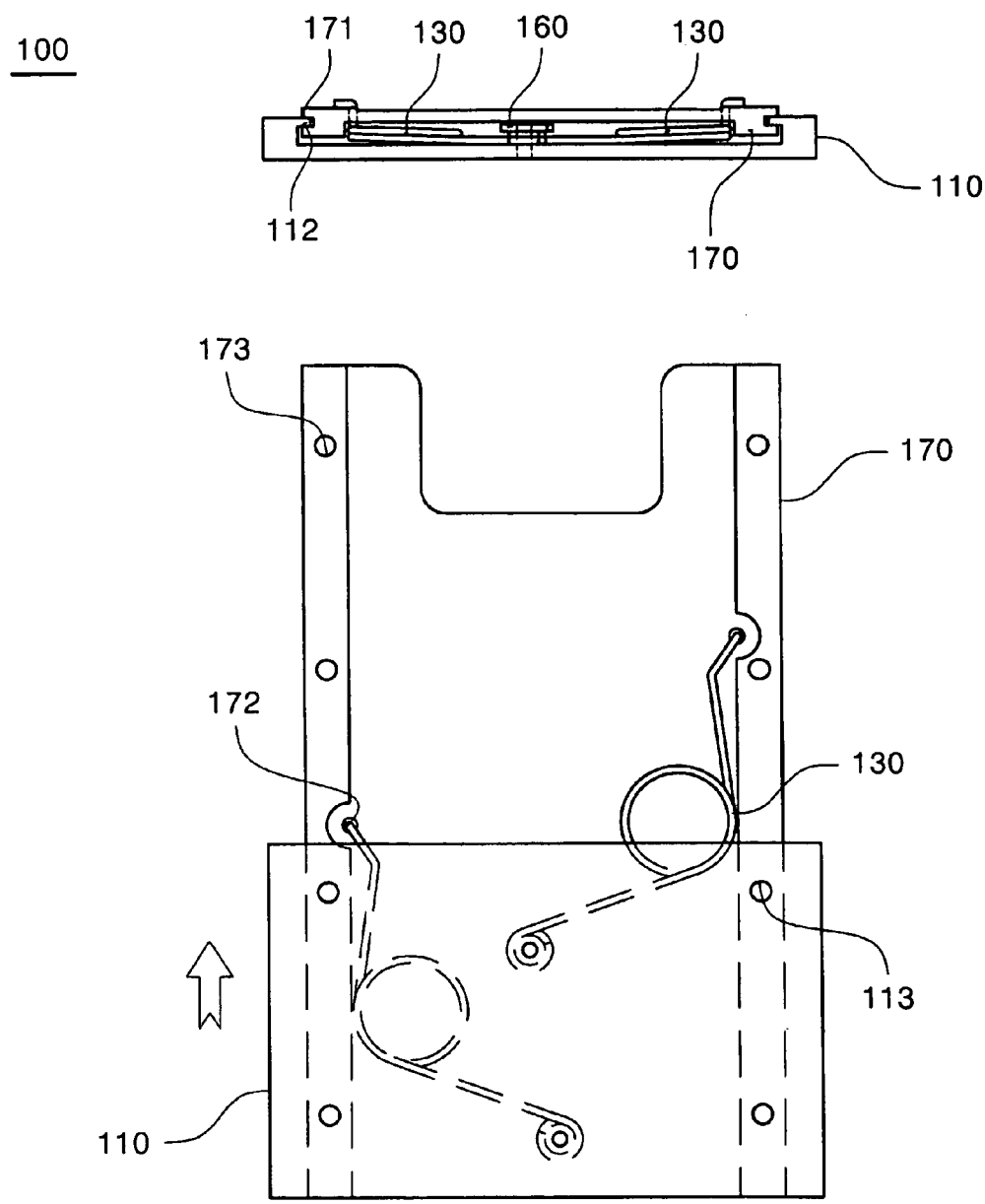
FIG. 26 is a schematic view of an exemplary slider assembly.

The slider assembly of the sliding-type cellular phone according to this embodiment comprises a fixing plate 10 fixed to the main body of the cellular phone, a sliding plate 20 fixed to the cover, and an up/down positioning means 30 including one end hinged to the fixing plate 10 and the other end hinged to the sliding plate 20 to change a direction of a force for pushing the sliding plate 20 from a specific sliding location of the sliding plate 20. Guide grooves 171 and guide bars 112 for guiding the sliding movement are formed at both sides of the fixing plate 10 and sliding plate 20, as shown in FIG. 26.

Referring to FIGS. 3 and 4, the up/down positioning means 30 comprises a pair of link sliders 31 with the same shape that can be restricted and slid with respect to each other, a pair of tension springs 32 fixed respectively to opposite ends of the link sliders, and guide protrusions 313 fixed to the link sliders 31, respectively, each of which is received in a guide slot 312 formed on each link slider to restrict and guide the link sliders. In this embodiment, a guide pin formed with a head 313*a* and a neck 313*b* is used as the guide protrusion 313.

Each of the link sliders 31 is formed with a hinge section 311 which has a through hole formed therein and is hinged to the fixing or sliding plate 10 or 20 by fitting a pin into the through hole, the guide slot 312 spaced apart from the hinge section 311 and formed in a longitudinal direction at a certain length, and a pair of spring engaging sections 314 formed at the other end thereof opposite to the hinge section to protrude laterally outward from the other end. The hinge sections 311 are bent at two steps to be easily fixed to the fixing plate 10 and the sliding plate 20 and to allow the tension springs 32 to be installed in a space defined between the two hinge sections.

In this embodiment, the guide slot 312 is composed of a guide pin-receiving portion 312*a* and a sliding guide portion 312*b*. The guide pin-receiving portion 312*a* of the guide slot 312 is formed adjacent to the hinge section 311 to have a width greater than a diameter of the head 313*a* of the guide pin 313 such that the guide pin 313 can be easily installed to or removed from the up/down positioning means.

Further, the sliding guide portion 312*b* has an appropriate length to restrict a sliding length of the cover of the cellular phone. That is, since the movement of the guide pin 313 is restricted at an end of the sliding guide portion 312*b* opposite to the hinge section 311, the sliding length of the sliding plate 20 is restricted. Accordingly, there is no need to install an additional stopper on the main body of the cellular phone for restricting the sliding motion of the sliding plate 20. Further, the sliding length of the sliding plate 20 can be adjusted by changing a position where the guide pin 313 is fixed.

In a pair of the link sliders 31 arranged to face each other, the guide pin 313 of the link slider 31 is received in the guide slot 312 of the corresponding link slider 31 to restrict and guide the sliding motion of each link slider 31 in only a longitudinal direction. Further, the guide pin 313 is composed of the head 313*a* and the neck 313*b* calked and fixed to the link slider 31. In such a case, a diameter of the head 313*a* is greater than a width of the sliding guide portion 312*b* of the guide slot 312 to prevent the assembled up/down positioning means from being disassembled.

Each of the pair of spring engaging sections 314 is formed with a hook recess 314*a* at a side facing away from the hinge section 311 such that a hook formed at an end of the tension spring 32 can be hooked into the hook recess. Further, as described in an embodiment shown in FIG. 6, through holes 314b can be formed on the spring engaging sections 314 to prevent the tension springs 32 from being separated from the spring engaging sections.

As compared with an up/down positioning means using a torsion spring, the up/down positioning means 30 according to an embodiment of the present invention has improved durability since it uses the tension springs. Further, it is possible to manufacture a cellular phone in which a constant urging force for sliding the slider assembly is required. Furthermore, since the pair of the tension springs 32 are fixed symmetrically to the spring engaging sections 314 of the linker sliders 31, the stable sliding motion of the link sliders 31 can be obtained. Since the tension spring 32 is fixed to the end of the link slider 31 to always impart an elastic force to the link slider 31 in a direction in which the entire length of the combined link sliders is increased, the sliding plate 20 can be always kept in a state where it is moved upward or downward (up/down) with respect to the fixing plate 10.

Hereinafter, the operation of the slider assembly according to this embodiment of the present invention will be described with reference to FIG. 5 (a) to (c).

FIG. 5 (a) shows a state where the two link sliders 31 are slid at a maximum distance from each other by a tension of the tension springs such that the entire length of the combined link sliders 31 is increased to the utmost. That is, the guide pin is brought into contact with an end of the guide slot away from the hinge section, and thus, the sliding motion of the slider link is restricted. The hinge section 311 of the first link slider of the up/down positioning means 30 is hinged to a middle portion of the fixing plate 10 by means of a pin, and the hinge section 311 of the second link slider is hinged to a middle portion of the sliding plate 20 by means of a pin. If a user pushes the sliding plate 20 leftward as viewed in the figure, the sliding plate 20 is slid and the tension springs 32 of the up/down positioning means are stretched while the respective link sliders 31 are pivoted on the pins, as shown in FIG. 5 (b). A pair of link sliders 31 that are restricted and combined with each other are slid toward the hinge sections of the corresponding link sliders, respectively, so that a change in the entire length of the combined link sliders due to the sliding motion of the sliding plate 20 can be absorbed. In a state shown in FIG. 5 (b), the tension of the tension spring 32 is maximized and the entire length of the link sliders 31 is minimized. Since the tension springs 32 are stretched until they are in such a state as shown in FIG. 5 (b), a user continuously apply a certain force to move the sliding plate 20. However, if the sliding plate 20 is slightly further moved leftward from the state shown in FIG. 5 (b), the sliding plate 20 is automatically moved leftward due to elastic energy stored in the tension spring 32. That is, while the pair of tension springs 32 are compressed, each of the tension springs pulls the link slider 31 fixed to the ends thereof to be closer to each other. Thus, the link slider 31 fixed to the sliding plate 20 pushes the sliding plate 20 which in turn is moved to such a state as shown in FIG. 5 (c). The sliding motion of the sliding plate from the state shown in FIG. 5 (c) to the state shown in FIG. 5 (a) is repeated in the same manner as to be described above. At this time, since the neck 313b of the guide pin 313 is brought into contact with the end of the sliding guide portion 312b to restrict the movement of the sliding plate 20, there is no need to provide an additional stopper in the main body of the cellular phone for restricting the sliding motion of the sliding plate 20.

Figure 6:
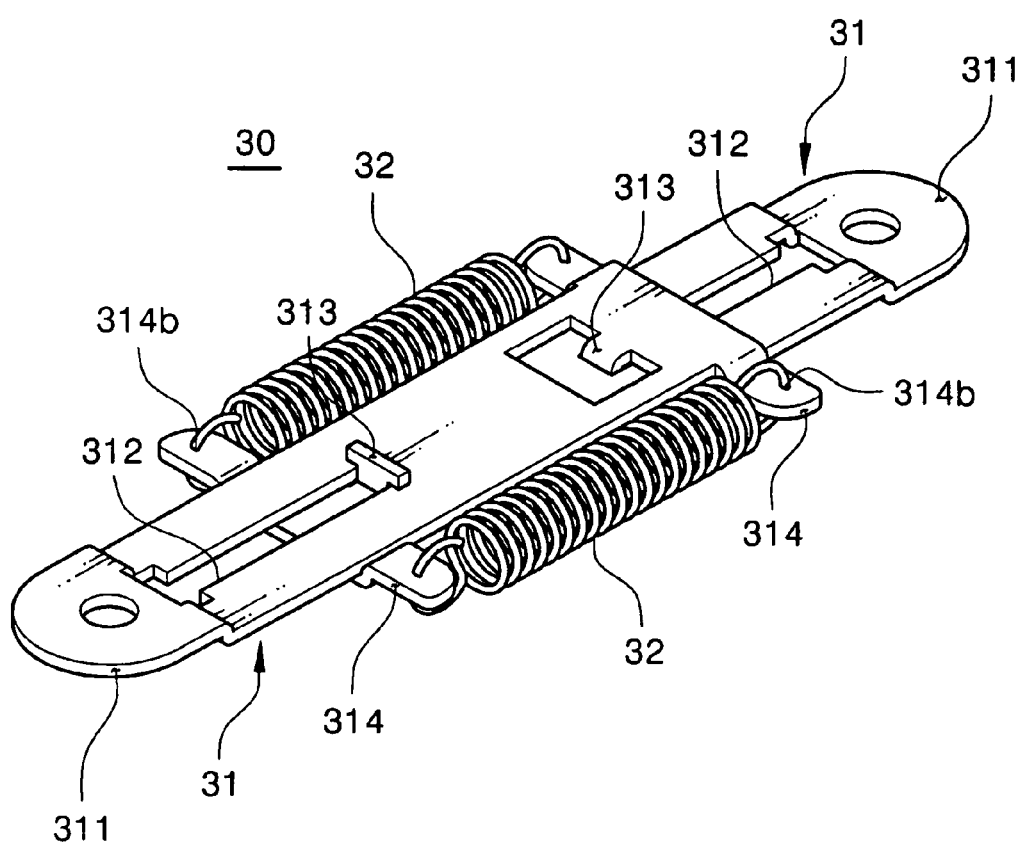
FIG. 6 is a perspective view of an up/down positioning means of a slider assembly according a second embodiment of the present invention.

FIG. 6 is a perspective view of an up/down positioning means of a slider assembly according a second embodiment of the present invention. The up/down positioning means of FIG. 6 is different from that of FIG. 4 in that the guide pin 313 is replaced with a guide protrusion 313 formed by partially cutting a certain portion of a guide slider 31 corresponding to a guide slot 312 adjacent to a hinge section 311 of another link slider 31 and then bending the partially cut portion toward a guide slot 312. Further, a width of a head of the guide protrusion 313 so formed is greater than a width of the guide slot to prevent a pair of assembled link sliders from being separated from each other.

Figure 7:
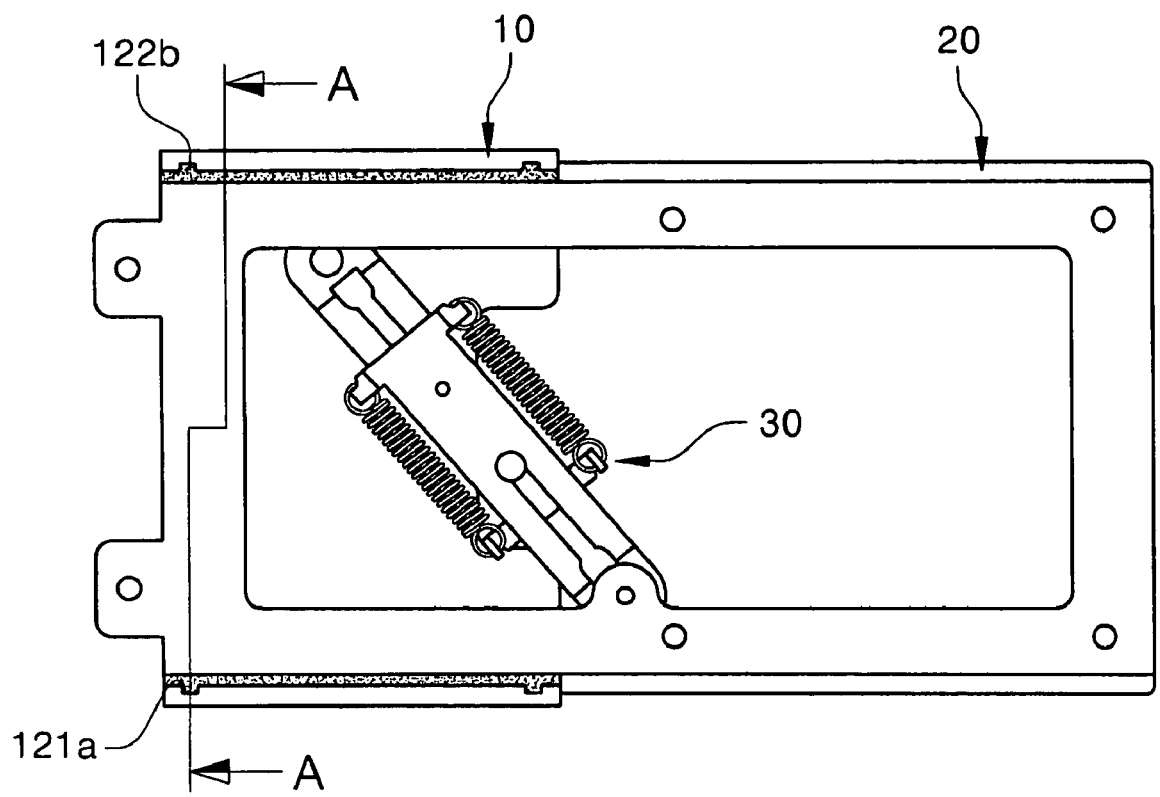
FIG. 7 is a plan view of a slider assembly for a sliding-type cellular phone according to a third embodiment of the present invention.
Figure 8:
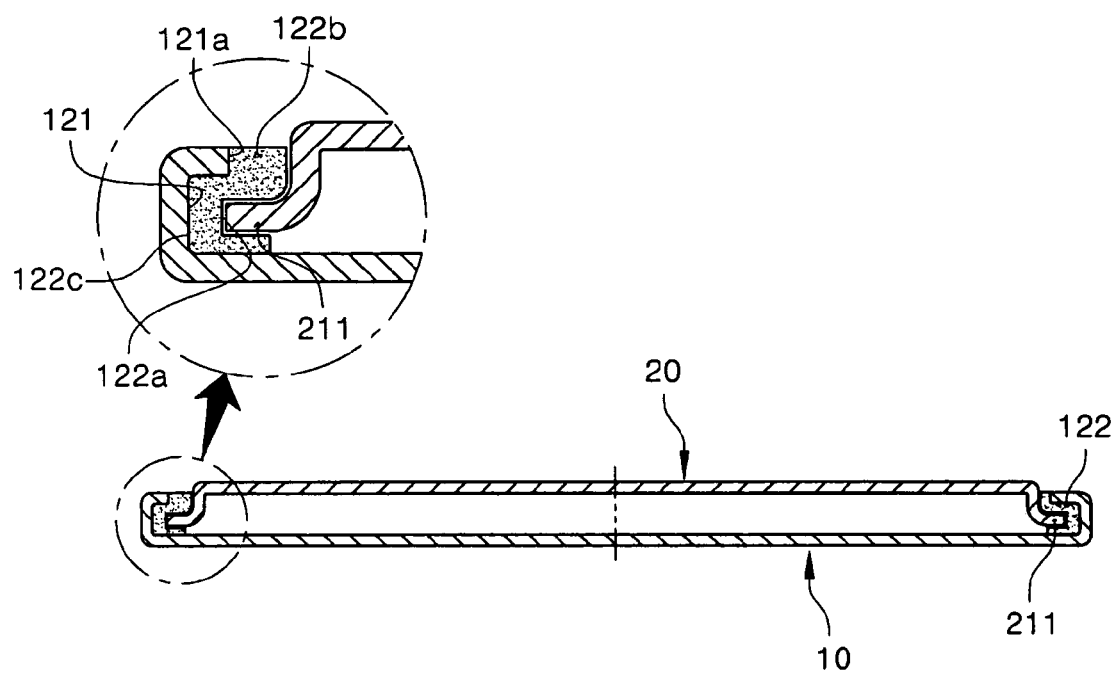
FIG. 8 is a sectional view taken along line A-A of FIG. 7.
Figure 9:
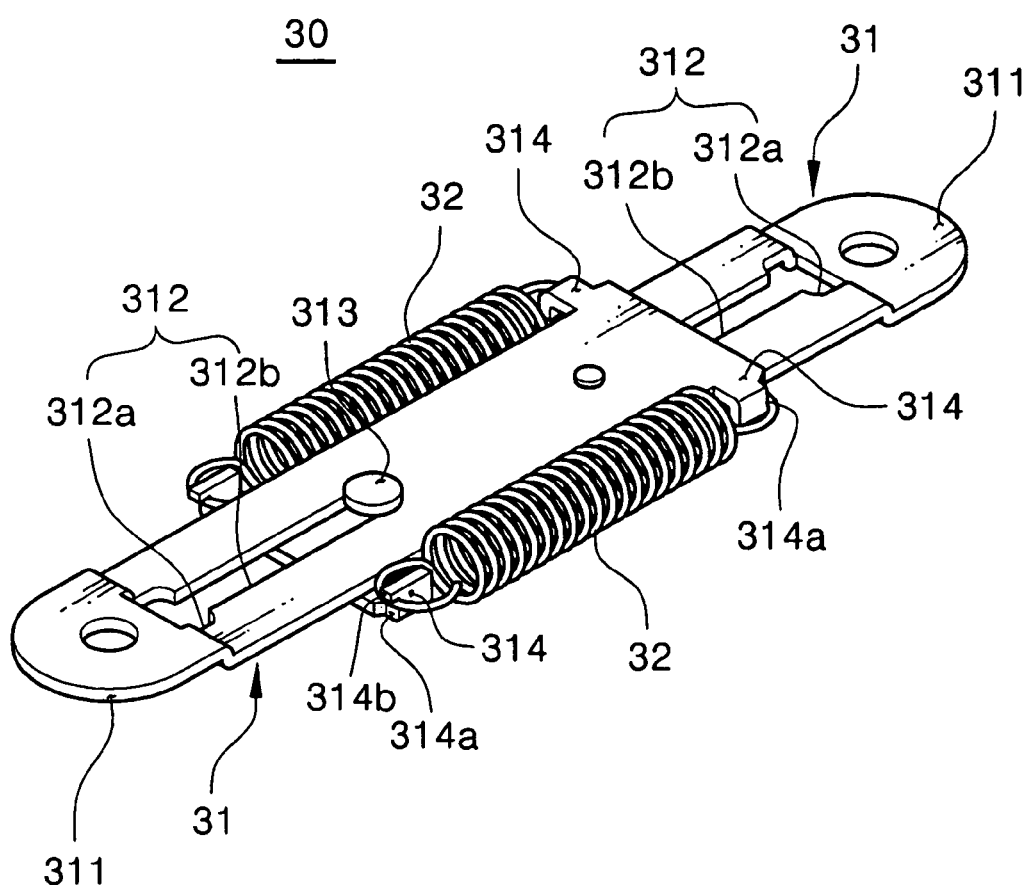
FIG. 9 is a perspective view of an up/down positioning means of a slider assembly according a fourth embodiment of the present invention.
Figure 10:
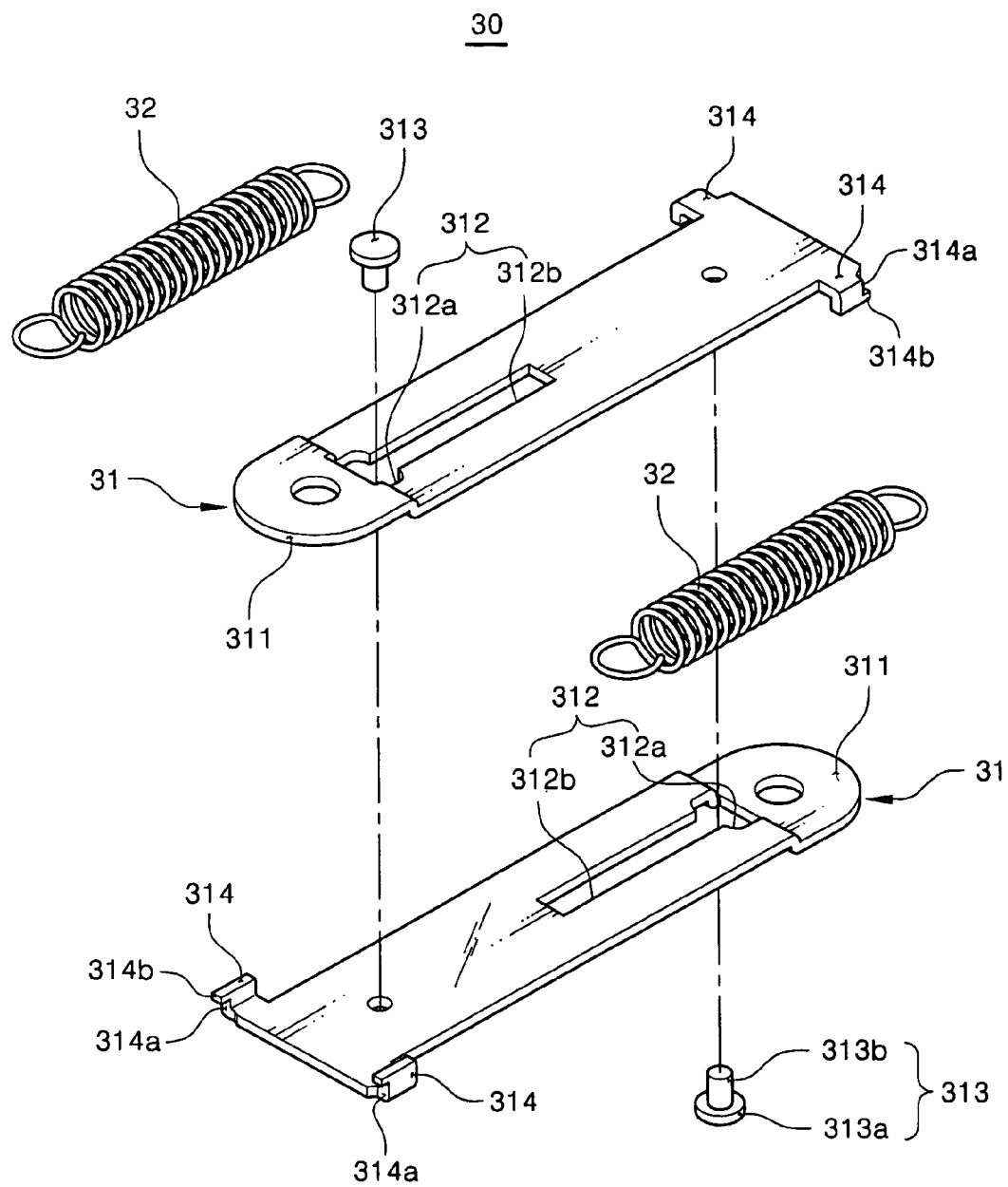
FIG. 10 is an exploded perspective view of the up/down positioning means shown in FIG. 9.
Figure 11:
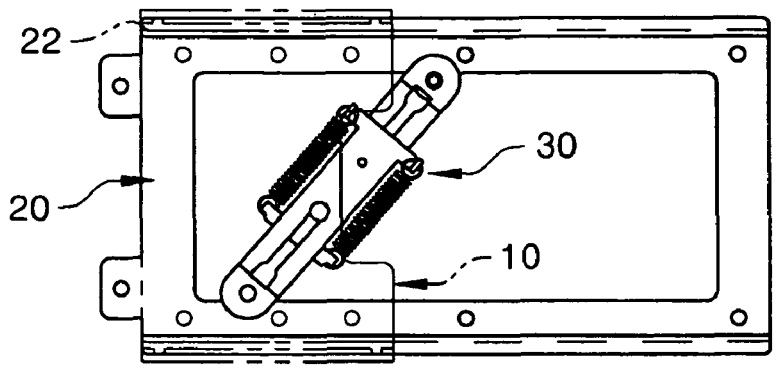
FIG. 11 (a) to (c) are views illustrating the operation state of the slider assembly according to the third embodiment of the present invention shown in FIG. 7.
Figure 11:
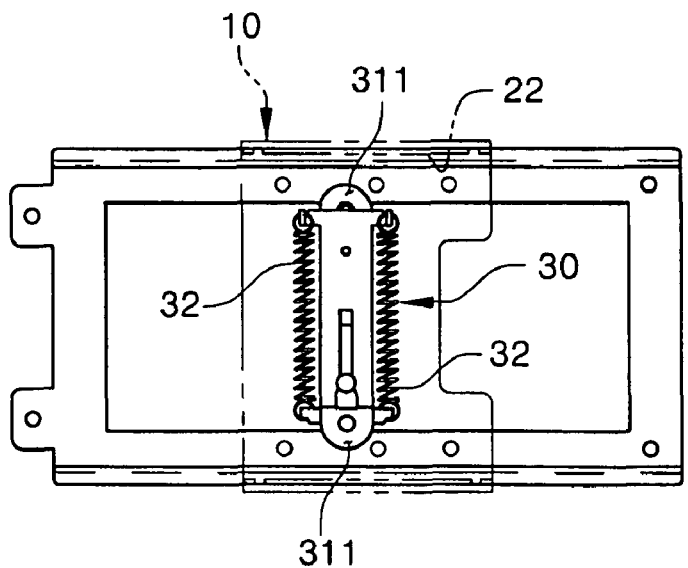
Figure 11:
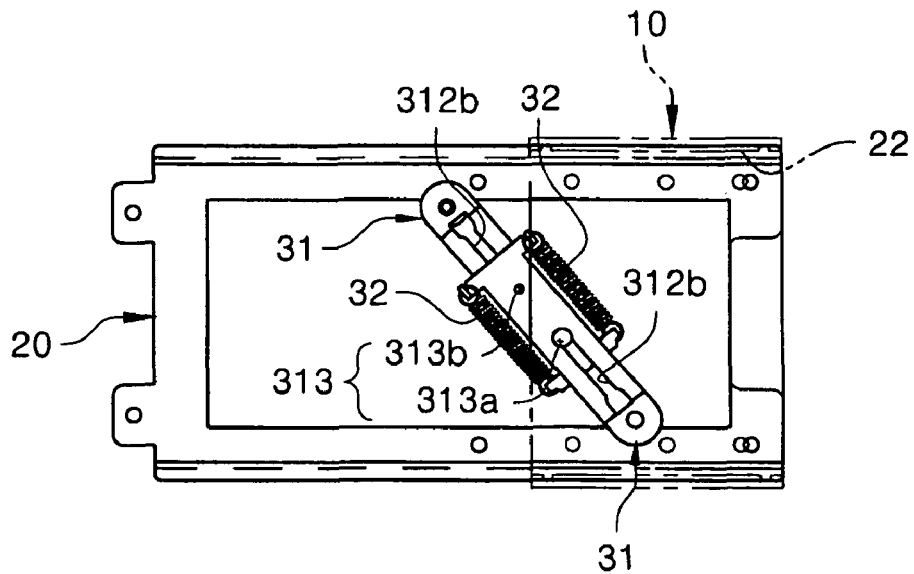
Figure 12:
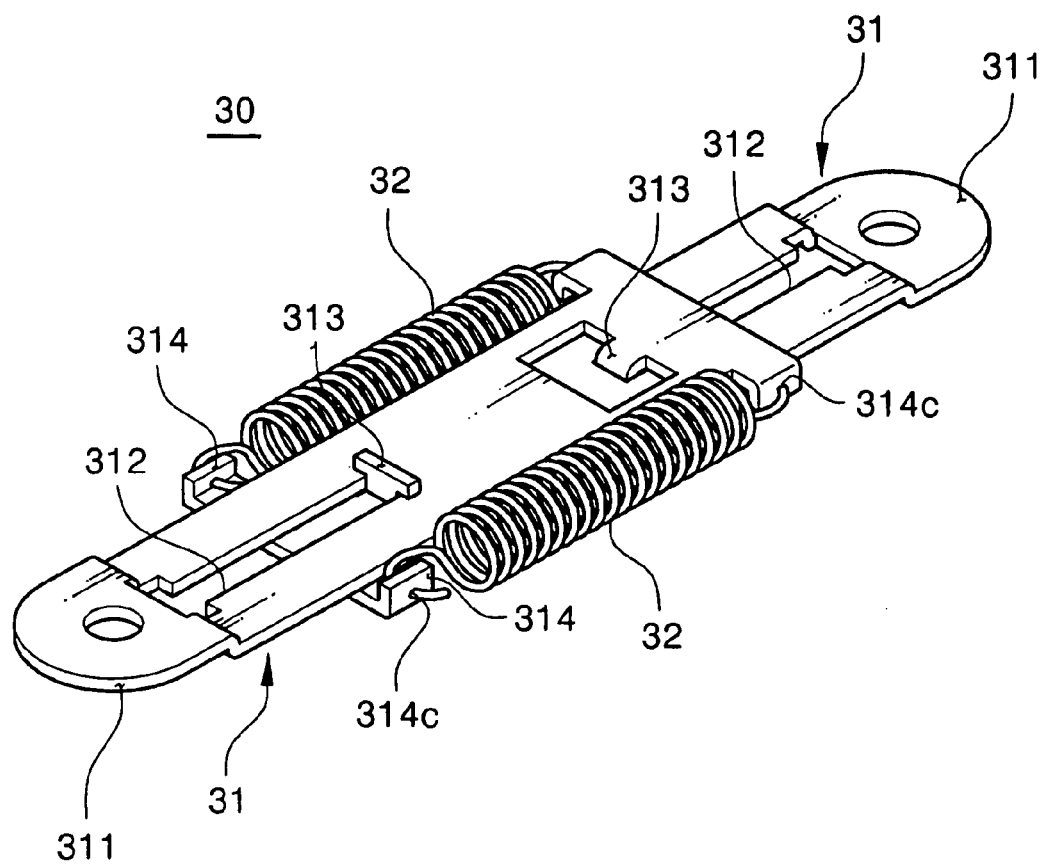
FIG. 12 is a perspective view of an up/down positioning means of a slider assembly according a fifth embodiment of the present invention.
Figure 13:
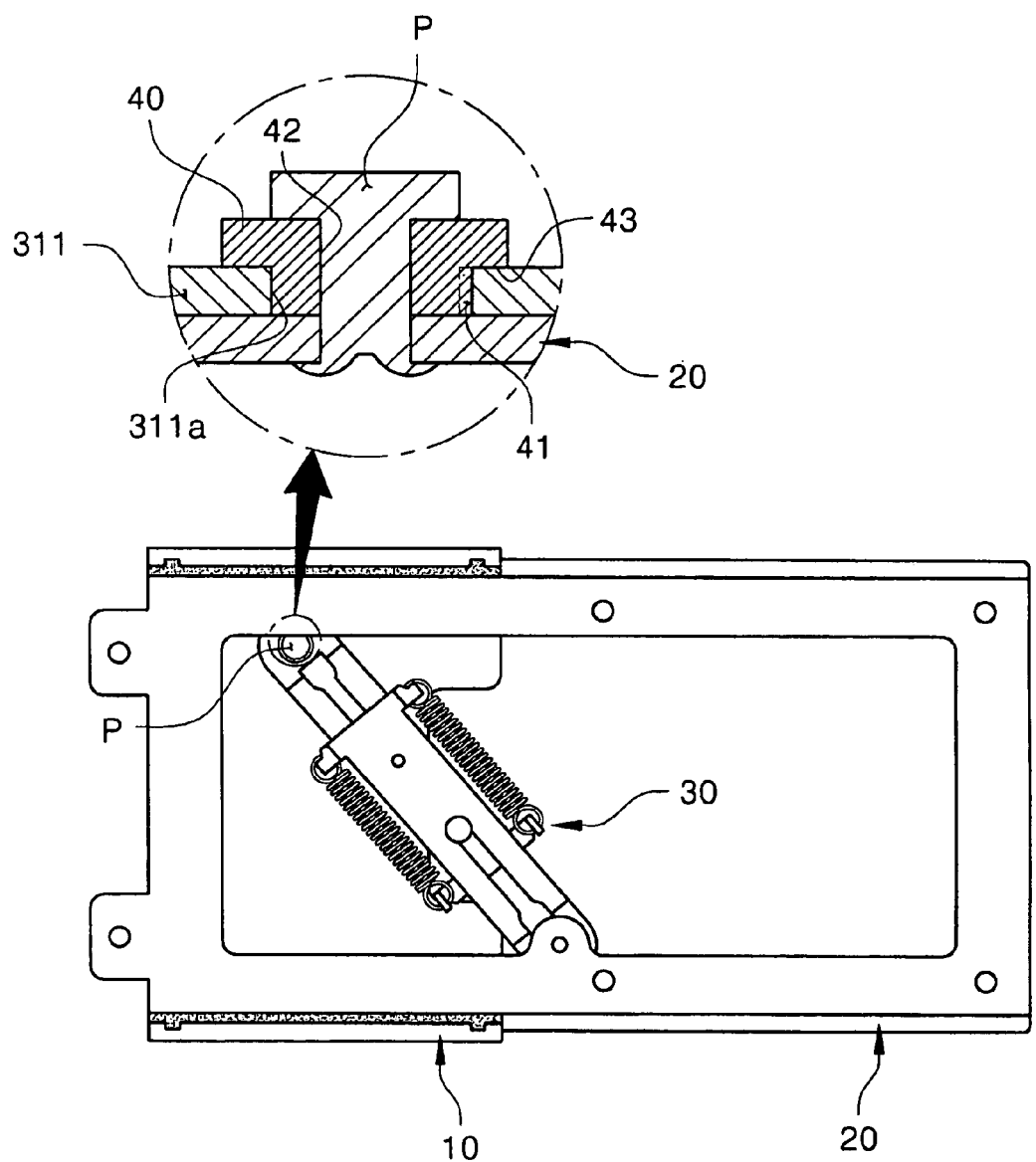
FIG. 13 is a plan view showing a coupled state of a hinge section of the up/down positioning means of the slider assembly according to the third to fifth embodiments of the present invention.

FIG. 7 is a plan view of a slider assembly for the sliding-type cellular phone according to a third embodiment of the present invention, FIG. 8 is a sectional view taken along line A-A in FIG. 7, FIG. 9 is a perspective view of an up/down positioning means of a slider assembly according a fourth embodiment of the present invention, FIG. 10 is an exploded perspective view of the up/down positioning means shown in FIG. 9, FIG. 11 (a) to (c) are views illustrating an operation state of the slider assembly according to the third embodiment of the present invention shown in FIG. 7, FIG. 12 is a perspective view of an up/down positioning means of a slider assembly according a fifth embodiment of the present invention, and FIG. 13 is a plan view showing a coupled state of a hinge section of the up/down positioning means of the slider assembly according to the third to fifth embodiments of the present invention.

The slider assembly for the sliding-type cellular phone according to the third embodiment of the present invention comprises a fixing plate 10 fixed to the main body of the cellular phone, a sliding plate 20 fixed to a cover, and an up/down positioning means 30 including one end hinged to the fixing plate 10 and the other end hinged to the sliding plate 20 to change a direction of a force for pushing the sliding plate 20 from a specific sliding location of the sliding plate 20. In order to prevent opposite sliding sides of the fixing plate 10 and sliding plate 20 from wearing out due to friction therebetween, guide bushes 122 are fitted into guide grooves 121 of the sliding plate 20, respectively.

Each of the guide bushes 122 is composed of a groove 122a in which a guide section 111 of the fixing plate 10, a fixing protrusion 122b formed on one side thereof to be spaced apart by a certain interval, and an attaching surface 122c fitted into the guide groove 121 of the sliding plate 20. Further, the guide bushes prevent the guide grooves 121 of the sliding plate 20, which are repeatedly slid, from wearing out and can be used for a long time without frequent exchange. In addition, the guide bushes may be made of a wear resistant material with a low dynamic coefficient of friction, and preferably, from polyoxymethylene (POM) that has been generally used.

Referring to FIGS. 9 and 10, the up/down positioning means 30 comprises a pair of link sliders 31 with the same shape that can be restricted and slid with respect to each other, a pair of tension springs 32 fixed respectively to ends of the link sliders 31, and guide protrusions 313 fixed to the link sliders 31, respectively, each of which is received in a guide slot 312 formed on each link slider 31 to restrict and guide the link sliders. In this embodiment, a guide pin formed with a head 313a and a neck 313b is used as the guide protrusion 313.

Each of the link sliders 31 comprises a hinge section 311 having a through hole 311a and hinged to the fixing or sliding plate 10 or 20 by fitting a pin P into the through hole, the guide slot 312 spaced apart from the hinge section 311 and formed in a longitudinal direction at a certain length, and a pair of spring engaging sections 314 formed at the other end thereof opposite to the hinge section 311 to protrude laterally outward from the other end. The hinge sections 311 are bent at two steps to be easily fixed to the fixing plate 10 and the sliding plate 20 and to allow the tension springs 32 to be installed in a space defined between the two hinge sections.

In the fourth embodiment, the guide slot 312 is composed of a guide pin-receiving portion 312a and a sliding guide portion 312b. The guide pin-receiving portion 312a of the guide slot 312 is formed adjacent to the hinge section 311 to have a width greater than a diameter of the head 313a of the guide pin 313 such that the guide pin 313 can be easily installed to or removed from the up/down positioning means.

In a pair of the link sliders 31 arranged to face each other, the guide pin 313 of the link slider 31 is received in the guide slot 312 of the corresponding link slider 31 to restrict and guide the sliding motion of each link slider 31 in only a longitudinal direction. Further, the guide pin 313 is composed of the head 313a and the neck 313b calked and fixed to the link slider 31. In such a case, a diameter of the head 313a is greater than a width of the sliding guide portion 312b of the guide slot 312 to prevent the assembled up/down positioning means from being disassembled.

Each of the pair of spring engaging sections 314 is formed with a hook recess 314a bent at a predetermined angle such that a hook formed at an end of the tension spring 32 can be caught into the hook recess. Further, a fixing protrusion 314b is formed at an end of the hook recess 314a so as to prevent the hook from being removed from the recess. In addition, as described in an embodiment shown in FIG. 12, through holes 314c can be formed on the spring engaging sections to prevent the tension springs 32 from being separated from the spring engaging sections.

The reason that the hook recess 314a is bent at the predetermined angle is that a flexible printed circuit board (PCB) installed on one surface of the fixing plate 10 can be operated without any interference with the up/down positioning means in order to prevent the malfunction of the cellular phone.

As compared with an up/down positioning means using a torsion spring, the up/down positioning means 30 of this embodiment has improved durability since it uses the tension springs. Further, it is possible to manufacture a cellular phone in which a constant urging force for sliding the slider assembly is required. Furthermore, since the pair of the tension springs 32 are fixed symmetrically to the spring engaging sections 314 of the linker sliders 31, the stable sliding motion of the link sliders 31 can be obtained. Since the tension spring 32 is fixed to the end of the link slider 31 to always impart an elastic force to the link slider 31 in a direction in which the entire length of the combined link sliders is increased, the sliding plate 20 can be always kept in a state where it is moved upward or downward (up/down) with respect to the fixing plate 10.

Hereinafter, the operation of the slider assembly according to the embodiment shown in FIG. 7 will be described with reference to FIG. 11(a) to (c).

FIG. 11 (a) shows a state where the two link sliders 31 are slid at a maximum distance from each other by a tension of the tension springs such that the entire length of the combined link sliders 31 is increased to the utmost. That is, the guide pin is brought into contact with an end of the guide slot away from the hinge section, and thus, the sliding motion of the slider link is restricted. The hinge section 311 of the first link slider of the up/down positioning means 30 is hinged to a middle portion of the fixing plate 10 by means of a pin, and the hinge section 311 of the second link slider is hinged to a middle portion of the sliding plate 20 by means of a pin. If a user pushes the sliding plate 20 leftward as viewed in the figure, the sliding plate 20 is slid and the tension springs 32 of the up/down positioning means are stretched while the respective link sliders 31 are pivoted on the pins, as shown in FIG. 11 (b). A pair of link sliders 31 that are restricted and combined with each other are slid toward the hinge sections of the corresponding link sliders, respectively, so that a change in the entire length of the combined link sliders due to the sliding motion of the sliding plate 20 can be absorbed. In a state shown in FIG. 11 (b), the tension of the tension spring 32 is maximized and the entire length of the link sliders 31 is minimized. Since the tension springs 32 are stretched until they are in such a state as shown in FIG. 11 (b), a user continuously apply a certain force to move the sliding plate 20. However, if the sliding plate 20 is slightly further moved leftward from the state shown in FIG. 11 (b), the sliding plate 20 is automatically moved leftward due to elastic energy stored in the tension spring 32. That is, while the pair of tension springs 32 are compressed, each of the tension springs pulls the link slider 31 fixed to the ends thereof to be closer to each other. Thus, the link slider 31 fixed to the sliding plate 20 pushes the sliding plate 20 which in turn is moved to such a state as shown in FIG. 11 (c). The sliding motion of the sliding plate from the state shown in FIG. 11 (c) to the state shown in FIG. 11 (a) is repeated in the same manner as to be described above. At this time, since the neck 313b of the guide pin 313 is brought into contact with the end of the sliding guide portion 312b to restrict the movement of the sliding plate 20, there is no need to provide an additional stopper in the main body of the cellular phone for restricting the sliding motion of the sliding plate 20.

FIG. 12 is a perspective view of an up/down positioning means of a slider assembly according the fifth embodiment of the present invention. The up/down positioning means of FIG. 12 is different from that of FIG. 9 in that the guide pin 313 is replaced a guide protrusion 313 by partially cutting a certain portion of a guide slider 31 corresponding to a guide slot 312 adjacent to a hinge section 311 of another link slider 31 and then bending the partially cut portion toward a guide slot 312. Further, a width of a head of the guide protrusion 313 so formed is greater than a width of the guide slot to prevent a pair of assembled link sliders from being separated from each other.

FIG. 13 is a plan view showing a coupled state of a hinge section of the up/down positioning means of the slider assembly according to the third to fifth embodiments of the present invention. Each of a pair of the link sliders 31 with the same shape, which can be restricted and slid with respect to each other, among the up/down positioning means 30 is formed with a hinge section 311 which has a through hole formed therein and is hinged to the fixing or sliding plate 10 or 20 by fitting a pin into the through hole.

At this time, since the hinge section 311 coupled with the pin P is easily worn down due to friction therebetween when the link slider is pivoted on the pin, a bushing 40 made of a wear resistant material such as polyoxymethylene (POM) with a low dynamic coefficient of friction is inserted between the hinge section 311 and the pin P to prevent the hinge section from wearing out.

The bushing 40 includes a through hole 42 formed at the center thereof, a contact surface 43 contacted with one side of the hinge section 311, and a fixing protrusion 41 fitted and fixed into the through hole 311a of the hinge section 311. The bushing 40 and the hinge section 311 can be coupled with each other by the fixing protrusion 41 in the form of a key. Preferably, the fixing protrusion is in the form of a groove. When the hinge section is pivoted, an inner surface of the through hole 42 of the bushing 40 fitted and fixed into the hinge section 311 is brought into contact with the pin P. Thus, the hinge section 311 and the pin P can be prevented from wearing out.

Figure 14:
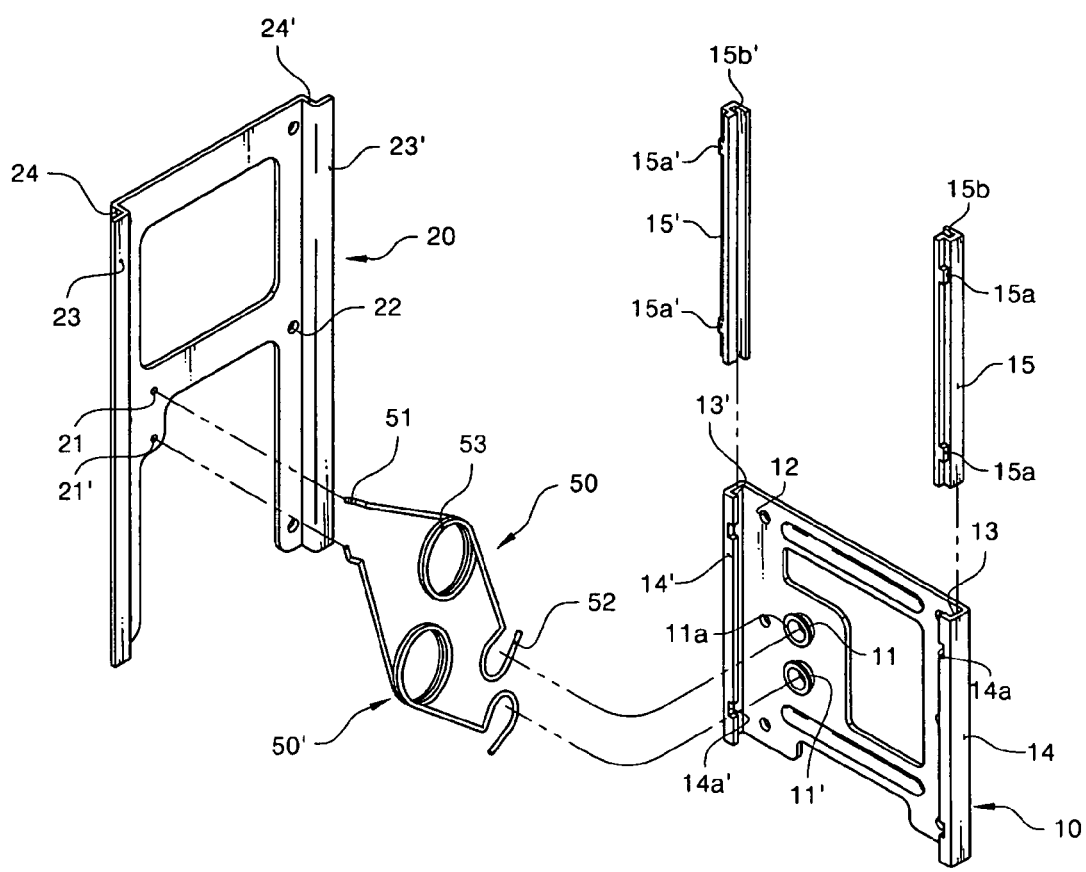
FIG. 14 is an exploded perspective view of a slider assembly for a sliding-type cellular phone according to a sixth embodiment of the present invention.
Figure 15:
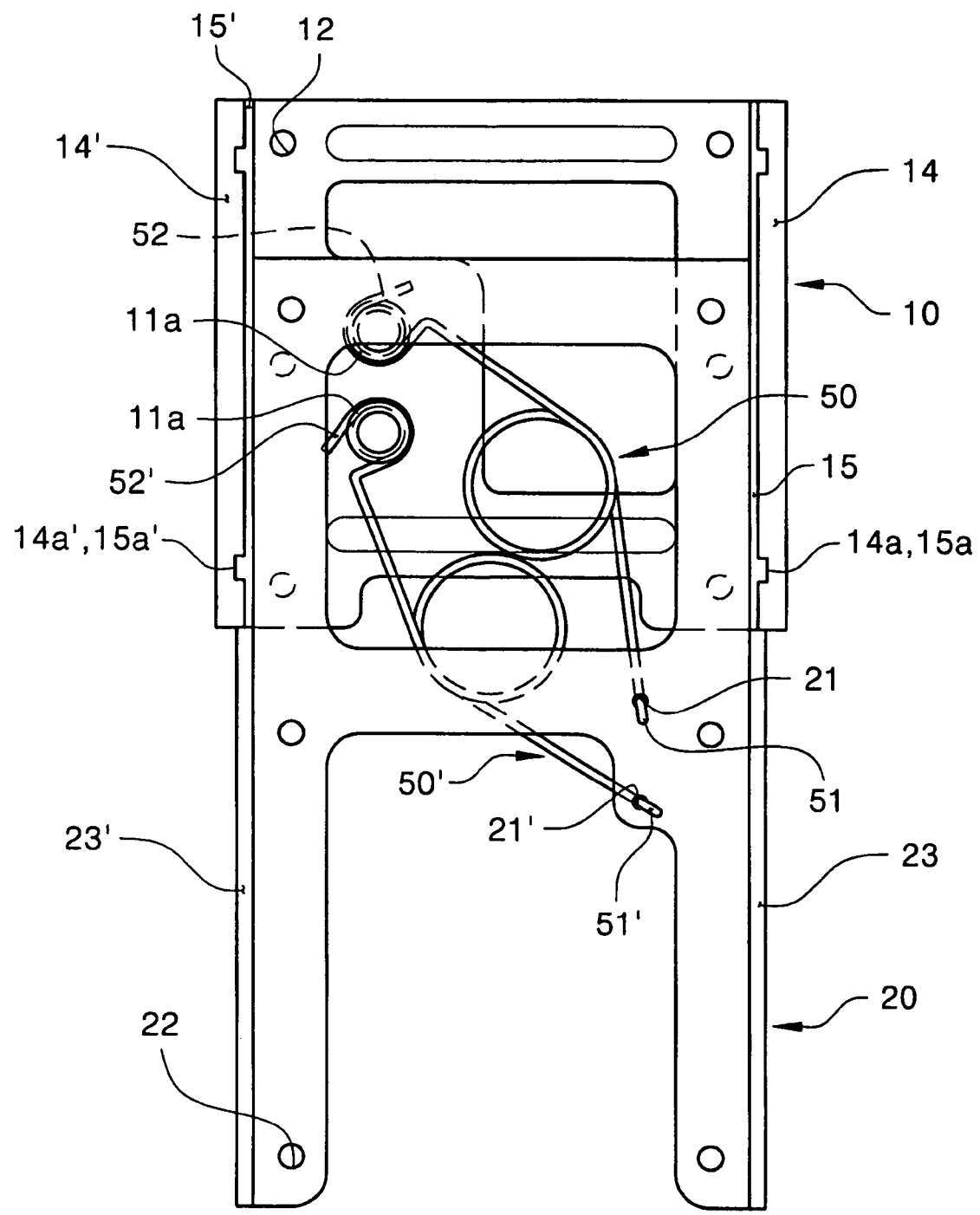
FIG. 15 is a view showing a state where the slider assembly of the sixth embodiment shown in FIG. 14 has been assembled.

FIG. 14 is an exploded perspective view of a slider assembly for the sliding-type cellular phone according to a sixth embodiment of the present invention, and FIG. 15 is a view showing a state where the slider assembly of the sixth embodiment shown in FIG. 14 has been assembled.

The slider assembly of the sixth embodiment comprises a fixing plate 10 fixed to a main body 1 of the cellular phone, a sliding plate 20 fixed to a cover 2, two springs 50 each of which has one end hingedly fixed to the fixing plate 10 and the other end hingedly fixed to the sliding plate 20, and sliding members 15 and 15' for preventing the sliding portions of the fixing plate 10 and sliding plate 20 from wearing out.

Both longitudinal side sections 14 and 14' of the fixing plate 10 are bent twice by a press, and thus, parallel fixing grooves 13 and 13' are formed at both side sections, respectively. A plurality of screw holes 12 are formed in the fixing plate 10 by a punching process such that the fixing plate 10 can be fixed to the main body 1 of the cellular phone. In particular, two supporting protrusions 11 and 11' are formed on the fixing plate 10 along a straight line parallel to the fixing grooves 13 and 13'. Each of the supporting protrusions 11 and 11' is formed by the press working to protrude toward the sliding plate 20 and has a circular outer circumferential surface and an expanded end portion 11a.

Further, the sliding members 15 and 15' with guide grooves 15b and 15b' formed thereon are inserted and installed in the fixing grooves 13 and 13', respectively. The sliding member has the same length as the fixing groove.

The sliding member is fixed to the fixing plate in such a manner that a pair of protrusions 15a and 15a' formed on the sliding member 15 or 15' at a certain interval are fitted and fixed into cutouts 14a and 14a' formed at certain positions on the bent side section 14 or 14' of the fixing plate 10, respectively. Further, the sliding members prevent wing sections 23 and 23' of the sliding plate 20, which are repeatedly slid, from wearing out and can be used for a long time without frequent exchange. In addition, the sliding members may be made of a wear resistant material with a low dynamic coefficient of friction, and preferably, from polyoxymethylene (POM) that has been generally used.

The sliding plate 20 includes first bent sections 24 and 24' that are formed on both sides of the sliding plate by bending a side portion of the sliding plate toward the fixing plate 10 through the press working, and the wing sections 23 and 23' formed to extend outward by bending the first bending sections 24 and 24' once more. A pair of the wing sections 23 and 23' are fitted into the guide grooves 15b and 15b' of the sliding members 15 and 15', respectively, that are installed in the fixing grooves 13 and 13' of the fixing plate 10, respectively, such that the sliding plate can be slid in a longitudinal direction. Further, the sliding plate 20 is formed with two through holes 21 and 21' in which one ends of the springs 30 and 30' are inserted such that the springs are hingedly supported. In addition, a plurality of screw holes 22 are formed in the sliding plate 20 such that the sliding plate can be fixed to the cover.

Each of the two springs 30 and 30' is a coil spring, made of steel wire, of which both ends are extended. A spring portion 33 formed by winding several times the steel wire is formed at the center of the coil spring. One end 32 of the spring has a round shape such that it can surround a portion of the outer circumference of the circular supporting protrusion 11 of the fixing plate 10. The other end 51 of the spring is bent first in a direction perpendicular to a plane defined by the circularly bent end 32 and then in a direction perpendicular to an extending direction of the first bent portion of the other end of the spring such that the second bent portion can be inserted in and pivoted on the through hole 21 of the sliding plate 20.

FIG. 15 is a view showing a state where the slider assembly of the sixth embodiment has been assembled.

As shown in the figure, the wing sections 23 and 23' formed at both sides of the sliding plate 20 are inserted in the respective guide grooves 15b and 15b' of the sliding members 15 and 15' installed in the fixing grooves 13 and 13' formed at both sides of the fixing plate 10, so that the sliding plate 20 can be slid in a longitudinal direction along the guide grooves 15b and 15b'. Further, one end of each of the two springs 50 surrounds a portion of the supporting protrusion 11 of the fixing plate 10 such that the spring can be pivoted with respect to the fixing plate, while the other end 51 of the spring is inserted in the through hole 21 of the sliding plate 20 such that the spring can be pivoted with respect to the sliding plate. Therefore, the sliding plate 20 is restricted by the springs 50 such that it is moved up and down within a predetermined distance.

In addition, if the springs 50 are broken, the one end of the spring 50 surrounding the supporting protrusion 11 of the fixing plate 10 can be easily separated and removed from the fixing plate. Thus, the broken spring can be easily exchanged.

In particular, the two supporting protrusions 11 and 11' of the fixing plate 10 are disposed in a straight line parallel to the fixing grooves 13 and 13', and the two through holes 21 and 21' of the sliding plate 20 are also disposed in a straight line parallel to the wing section 23 to be inserted in the recess grooves 13 and 13'. That is, an imaginary straight line connecting the supporting protrusions 11 and 11' is in parallel to the fixing grooves 13 and 13', and the supporting protrusions 11 and 11' are disposed such that a distance is as great as possible. When the sliding plate 20 is moved up and down, therefore, an amount of deformation of the spring becomes smaller, and thus, the life span of the spring 50 can be prolonged. Further, the one ends of the two springs 50 and 50' are pivotally fixed to the same side with respect to the fixing groove 13', and the other ends of the two springs are pivotally fixed to the same side with respect to the fixing groove 13. Therefore, when the sliding plate is slid, an elastic force of each spring is applied in only one direction. Consequently, since the wing section 23 of the sliding plate 20 is slid along the fixing groove 13 of the fixing plate 10 in a state where the former is brought into contact with the latter, it is possible to prevent the cover from shaking from side to side when the cover is slid.

Furthermore, until the center of the through hole 21 of the sliding plate 20 is coincident with the center of the supporting protrusion 11 of the fixing plate 10 after the sliding plate 20 has been moved, an elastic force of the spring 50 or 50' is applied in a direction in which the sliding motion of the sliding plate is hindered. Once the sliding plate has passed through a position where the through hole is coincident with the supporting protrusion, an elastic force of the spring is applied in a direction in which the sliding motion of the sliding plate is promoted. Therefore, if a user wants to slide and open the cover, the user can merely apply a certain force to the cover only until the center of the through hole 21 or 21' of the sliding plate 20 is coincident with the center of the supporting protrusion 11 or 11' of the fixing plate 10, because the cover is then slid automatically by the elastic force of the springs 50 and 50'.

Figure 16:
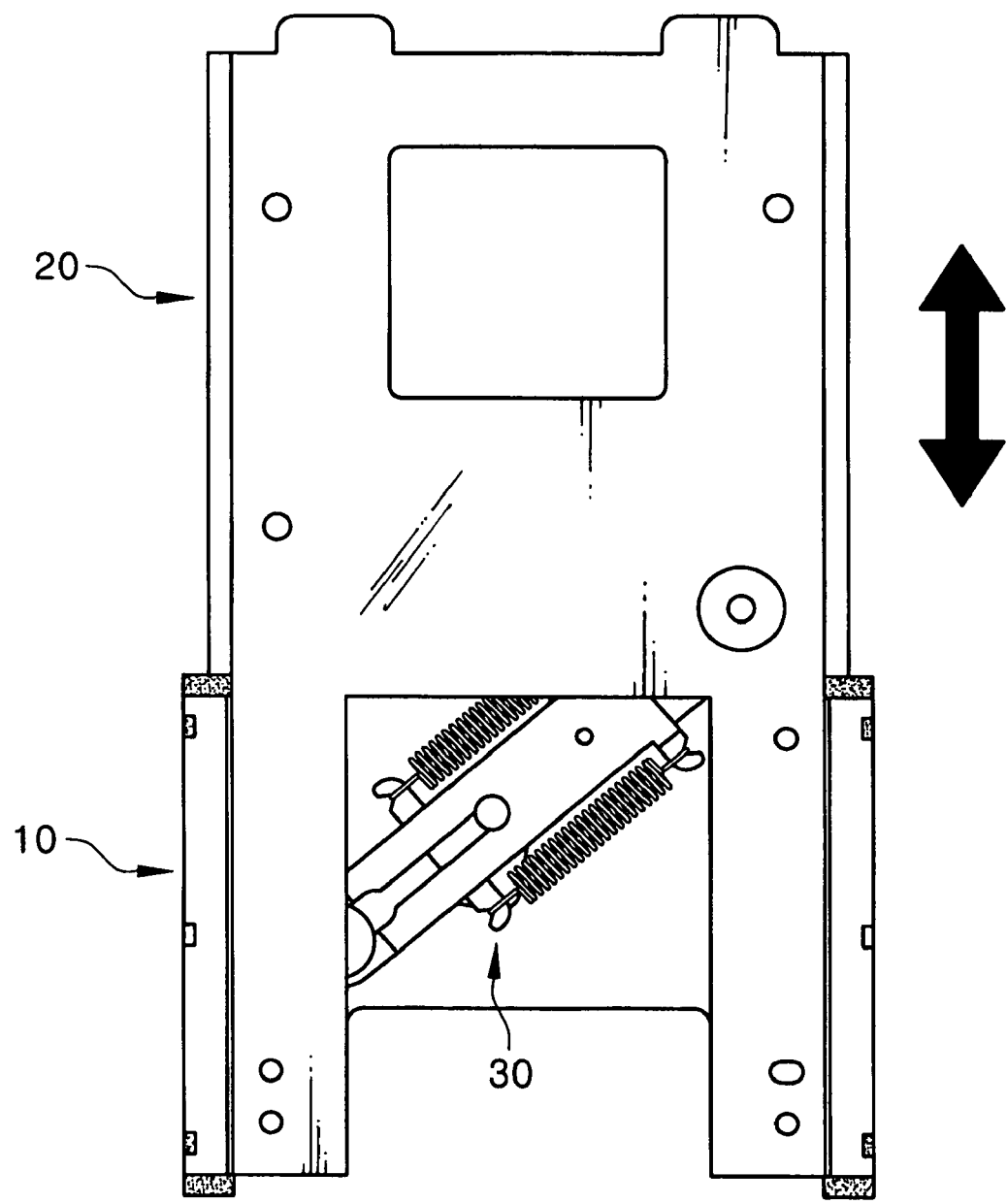
FIG. 16 is a plan view of a slider assembly for a sliding-type cellular phone according to a seventh embodiment of the present invention.
Figure 17:
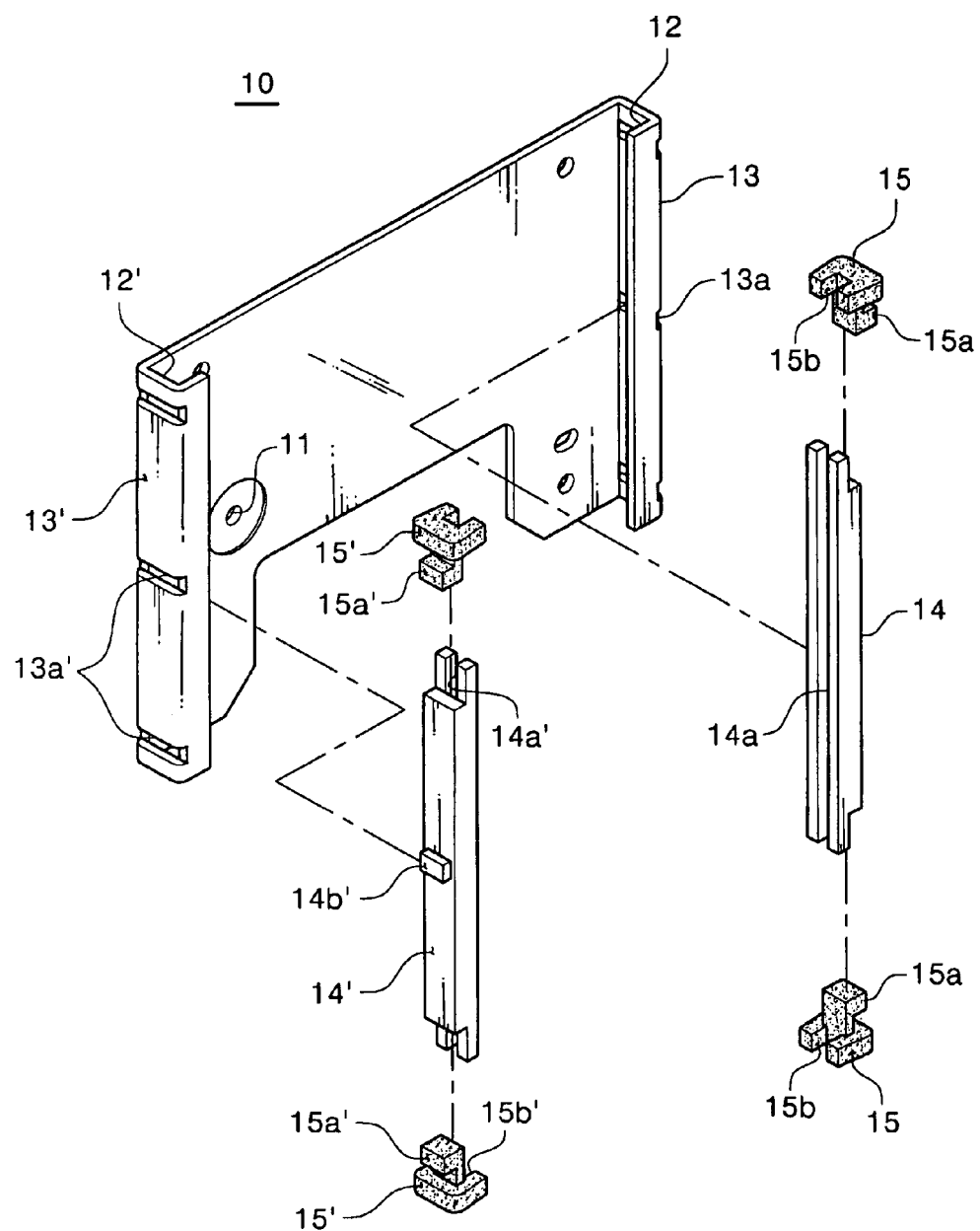
FIG. 17 is an exploded perspective view of a fixing plate of the embodiment shown in FIG. 16.
Figure 18:
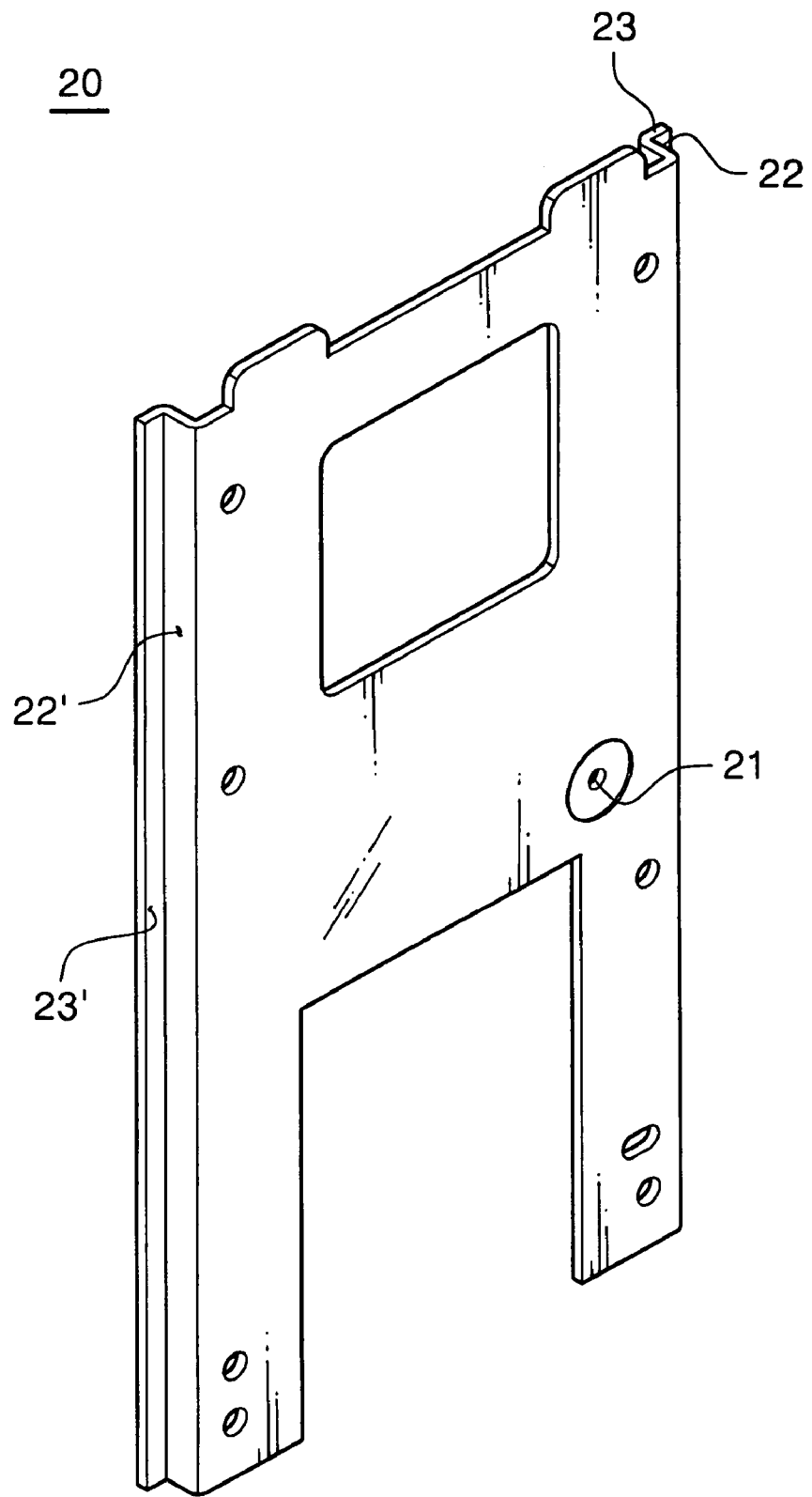
FIG. 18 is a perspective view of a sliding plate of the embodiment shown in FIG. 16.
Figure 19:
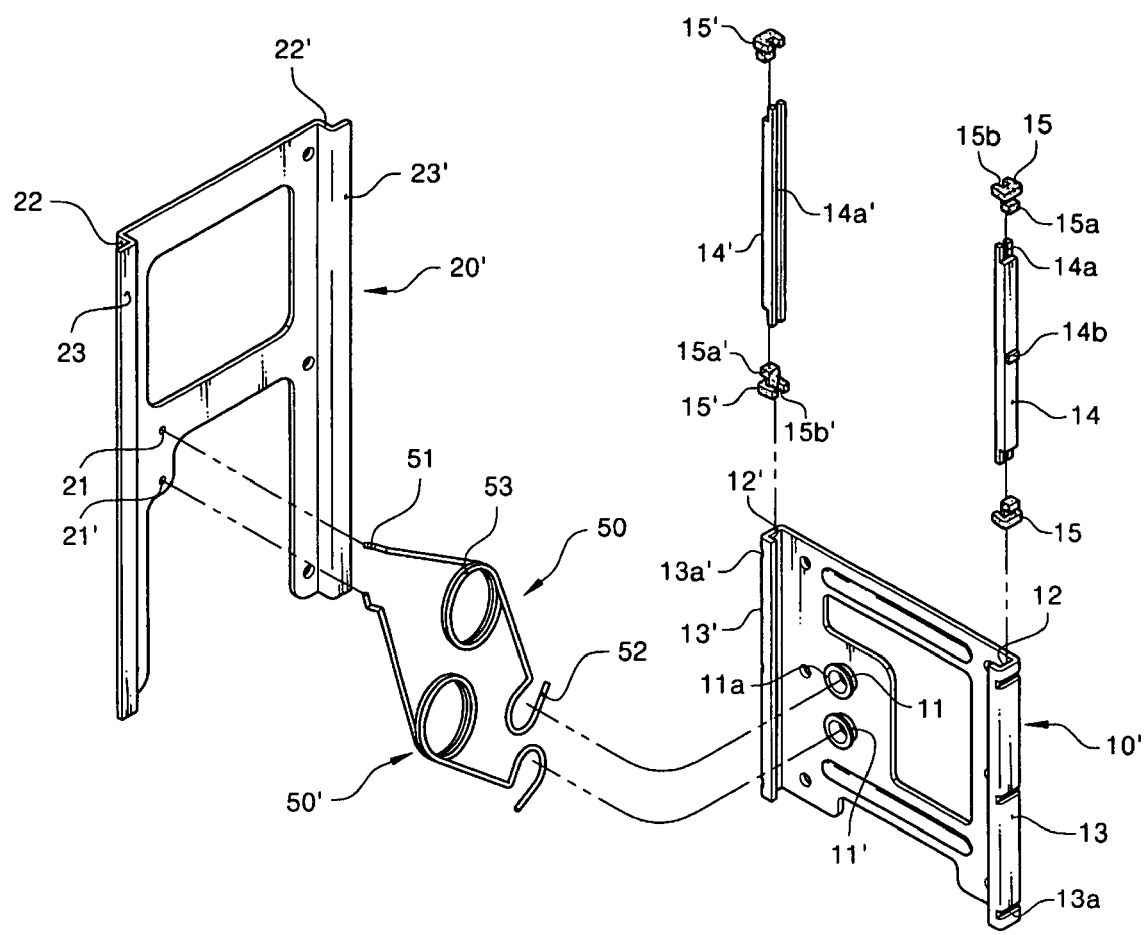
FIG. 19 is an exploded perspective view of a slider assembly for a sliding-type cellular phone according to an eighth embodiment of the present invention.

FIG. 16 is a plan view of a slider assembly for the sliding-type cellular phone according to a seventh embodiment of the present invention, FIG. 17 is an exploded perspective view of a fixing plate of the embodiment shown in FIG. 16, FIG. 18 is a perspective view of a sliding plate of the embodiment shown in FIG. 16, and FIG. 19 is an exploded perspective view of a slider assembly for the sliding-type cellular phone according to an eighth embodiment of the present invention.

The slider assembly 100 for the sliding-type cellular phone according to the seventh embodiment of the present invention comprises a fixing plate 10 formed with a guide section for guiding a linear motion of a sliding plate and fixed to an surface of a main body of the sliding-type cellular phone, a sliding plate 20 guided linearly by the guide section of the fixing plate 10 and fixed to an opposite surface of a cover of the cellular phone, and an up/down positioning means 30 including one end hinged to the fixing plate 10 and the other end hinged to the sliding plate 20 to change a direction of a force for pushing the sliding plate 20 from a specific sliding location of the sliding plate 20. Further, in order to prevent both sliding sides of the fixing plate 10 and sliding plate 20 from wearing out, guide bushes 14 and 14 are inserted and installed in fixing grooves 12 and 12' of the fixing plate 10, respectively.

FIG. 17 is an exploded perspective view of the fixing plate 10. Referring to this figure, each of both side sections 13 and 13 of the fixing plate 10 includes a pair of opposite and parallel fixing grooves 12 and 12' formed by twice bending a side portion of the fixing plate through the press working, and a plurality of through holes 13a and 13a' formed on the first bent side of the fixing grooves 12 and 12'. Further, the fixing plate 10 is formed with a plurality of screw holes for fixing the fixing plate to the main body 1 of the cellular phone and a hinge hole 11 into which one end of the up/down positioning means 30 is fitted.

Each of the guide bushes 14 and 14' fitted respectively into the fixing grooves 12 and 12' in a longitudinal direction comprises a longitudinal guide groove 14a or 14a' for receiving the wing section 23 or 23' of the sliding plate 20 and guiding the sliding motion of the sliding plate, and a plurality of protrusions 14a or 14b' formed on a surface corresponding to the through holes 13a or 13a' of the fixing plate 10.

Each of dampers 15 and 15' installed at both longitudinal ends of the guide bushes 14 or 14' includes a protrusion 15 or 15' fixed in the though hole 13a or 13a' and protruding further from a longitudinal end of the fixing plate 10, and a guide groove 15b or 15b' for guiding the wing section 23 or 23' of the sliding plate 20. When the two dampers are installed at both ends of the guide bush 14 or 14', the guide groove 14a or 14a of the guide bush 14 or 14' and the guide groove 15b or 15b' of the damper 15 or 15' are aligned on the same line.

The guide bushes 14 and 14' prevent the fixing grooves of the fixing plate from wearing out due to friction with the wing sections 23 and 23' of the sliding plate 20 which are repeatedly slid and can be made of a wear resistant material with a low dynamic coefficient of friction such that it can be used for a long time without frequent exchange. Preferably, the guide bushes are made of polyoxymethylene (POM) that has been generally used. Further, the dampers 15 and 15' absorb shock generated when the sliding plate is slid and prevents the shock from being transferred to the guide bushes 14 and 14' and thus the guide bushes from being damaged. Preferably, the dampers 15 and 15' are made of urethane rubber with an excellent shock-absorbing property.

FIG. 18 is a perspective view of the sliding plate 10. Referring to this figure, the sliding plate 20 includes a plurality of screw holes used for fixing the sliding plate to the cover, a hinge hole 21 into which the other end of the up/down positioning means 30 is fitted, bent sections 22 and 22' formed at both lateral sides of the sliding plate by bending side portions of the sliding plate toward the fixing plate 10 using a press, and wing sections 23 and 23' formed by additionally bending portions of the bent sections to extend outward. A pair of the wing section 23 and 23' are inserted into the guide grooves of the guide bush 14 and 14' and damper 15 and 15' installed in the fixing groove 12 and 12' of the fixing plate 10, respectively, such that the sliding plate can be slid up and down in a longitudinal direction.

FIG. 19 is an exploded perspective view of the slider assembly of the eighth embodiment of the present invention. Referring to this figure, the up/down positioning means comprises a pair of link sliders 31 with the same shape that can be restricted and slid with respect to each other, a pair of tension springs 32 fixed respectively to ends of the link sliders 31, and guide pins 313 fixed respectively to the link sliders 31, each of which is received in a guide slot 312 formed on each link slider 31 to restrict and guide the link sliders and includes a head 313a and a neck 313b.

Each of the link sliders 31 comprises a hinge section 311 having a through hole and hinged to the fixing or sliding plate 10 or 20 by fitting a pin into the through hole, a guide slot 312 spaced apart from the hinge section 311 and formed in a longitudinal direction at a certain length, and a pair of spring engaging sections 314 formed at the other end thereof opposite to the hinge section 311 to protrude laterally outward from the other end.

The hinge sections 311 are bent at two steps to be easily fixed to the fixing plate 10 and the sliding plate 20 and to allow the tension springs 32 to be installed in a space defined between the two hinge sections. The guide slot 312 is composed of a guide pin-receiving portion 312a of and a sliding guide portion 312b. The guide pin-receiving portion 312a of the guide slot 312 is formed adjacent to the hinge section 311 to have a width greater than a diameter of the head 313a of the guide pin 313 such that the guide pin 313 can be easily installed to or removed from the up/down positioning means.

In a pair of the link sliders 31 arranged to face each other, the guide pin 313 of the link slider 31 is received in the guide slot 312 of the corresponding link slider 31 to restrict and guide the sliding motion of each link slider 31 in only a longitudinal direction. Further, the guide pin 313 is composed of the head 313a and the neck 313b calked and fixed to the link slider 31. In such a case, a diameter of the head 313a is greater than a width of the sliding guide portion 312b of the guide slot 312 to prevent the assembled up/down positioning means from being disassembled.

Each of the pair of spring engaging sections 314 is formed with a hook recess 314a bent at a predetermined angle such that a hook formed at an end of the tension spring 32 can be caught into the hook recess.

Since the pair of the tension springs 32 are fixed symmetrically to the spring engaging sections 314 in the linker sliders 31, the stable sliding motion of the link sliders 31 can be obtained. Since the tension spring 32 is fixed to the end of the link slider 31 to always impart an elastic force to the link slider 31 in a direction in which the entire length of the combined link sliders is increased, the sliding plate 20 can be always kept in a state where it is moved upward or downward (up/down) with respect to the fixing plate 10.

The operation of the up/down positioning means according to this embodiment of the present invention will be briefly explained. The sliding motion of the link sliders is restricted when the entire length of the link sliders 31 combined by the tension of the tension springs is maximized. That is, the guide pin 313 is brought into contact with an end of the guide slot 312 opposite to the hinge section 311 to restrict the sliding motion of the slider link. The hinge section 311 of the first link slider of the up/down positioning means 30 is hinged to a middle portion of the fixing plate 10 by means of a pin, and the hinge section 311 of the second link slider is hinged to a middle portion of the sliding plate 20 by means of a pin.

If a user pushes the sliding plate 20, the sliding plate 20 is slid and the tension springs 32 of the up/down positioning means 30 are stretched while the respective link sliders 31 hinged thereto are pivoted on the pins. At the same time, a pair of the link sliders 31 that are restricted and combined with each other are slid toward the hinge sections of the corresponding link sliders, respectively, so that a change in the entire length of the combined link sliders due to the sliding motion of the sliding plate 20 can be absorbed. At this time, the tension of the tension spring 32 is maximized and the entire length of the link sliders 31 is minimized.

As described above, the tension springs 32 are stretched up to a maximum stretched position, and thus, a user apply the force to the sliding plate 20 in order to further move the sliding plate. After the maximum stretched position, the sliding plate 20 will be automatically slid due to elastic energy stored in the tension springs 32 in a direction in which the user wants to push the sliding plate. That is, while the pair of tension springs 32 are compressed, each of the tension springs pulls the link slider 31 fixed to the ends thereof to be closer to each other. Thus, the link slider 31 fixed to the sliding plate 20 pushes the sliding plate 20.

With the up/down positioning means 30 according to an embodiment of the present invention, it is possible to manufacture a cellular phone in which a constant urging force for sliding the slider assembly is required.

FIG. 19 is an exploded perspective view of the slider assembly for the sliding-type cellular phone according to the eighth embodiment of the present invention, in which the up/down positioning means of the slider assembly is different from that of the seventh embodiment of the present invention.

The slider assembly of this embodiment comprises a fixing plate 10' fixed to a main body of the cellular phone, a sliding plate 20' fixed to a cover, an up/down positioning means including one end hinged to the fixing plate 10' and the other end hinged to the sliding plate 20', and guide bushes 14 and 14' and dampers 15 and 15' for preventing sliding portions of the fixing plate 10' and sliding plate 20' from wearing out.

Two supporting protrusions 11 and 11' are further formed on the fixing plate 10' in a straight line parallel to the fixing grooves 12 and 12'. Each of the supporting protrusions 11 and 11' is formed by the press working to protrude toward the sliding plate 20' and has a circular outer circumferential surface and an extended end portion 11a.

In the meantime, the shape and function of the guide bushes 14 and 14' and the dampers 15 and 15' inserted in the fixing grooves 12 and 12' in a longitudinal direction are the same as those described in the seventh embodiment.

Further, the sliding plate 20' includes first bent sections 22 and 22' that are formed on both sides of the sliding plate by bending a side portion of the sliding plate toward the fixing plate 10' through the press working, and wing sections 23 and 23' formed to extend outward by bending the first bending sections 22 and 22' once more. A pair of the wing sections 23 and 23' are fitted into the guide grooves of the guide bushes 14 and 14' and the dampers 15 and 15', respectively, that are installed in the fixing grooves 12 and 12' of the fixing plate 10', respectively, such that the sliding plate can be slid up and down in a longitudinal direction. Further, the sliding plate 20' is formed with two through holes 21 and 21' in which one ends of the springs 50 and 50' are inserted such that the springs are hingedly supported. In addition, a plurality of screw holes are formed in the sliding plate 20' such that the sliding plate can be fixed to the cover.

Each of the two springs 50 and 50' serving as an up/down positioning means is a coil spring, made of steel wire, of which both ends are extended. A spring portion 53 formed by winding several times steel wire is formed at the center of the coil spring. One end 52 of the spring has a round shape such that it can surround a portion of the outer circumference of the circular supporting protrusion 11 of the fixing plate 10'. The other end 51 of the spring is bent first in a direction perpendicular to a plane defined by the circularly bent end 52 and then in a direction perpendicular to an extending direction of the first bent portion of the other end of the spring such that the second bent portion can be inserted in and pivoted on the through hole 21 of the sliding plate 20'.

The operation of the up/down positioning means 50 of this embodiment will be briefly explained. That is, the wing sections 23 and 23' formed at both sides of the sliding plate 20' are inserted in the respective guide grooves 14a, 14a', 15b and 15b' of the guide bushes 14 and 14' and dampers 15 and 15' installed in the fixing grooves 12 and 12' formed at both sides of the fixing plate 10', so that the sliding plate 20' can be slid up and down in a longitudinal direction along the guide grooves 14a, 14a', 15b and 15b'. Further, one end 52 of each of the two springs 50 surrounds a portion of the supporting protrusion 11 of the fixing plate 10' such that the spring can be pivoted with respect to the fixing plate, while the other end 51 of the spring is inserted in the through hole 21 of the sliding plate 20' such that the spring can be pivoted with respect to the sliding plate. Therefore, the sliding plate 20' is restricted by the springs 50 such that it is moved up and down within a predetermined distance.

In particular, the two supporting protrusions 11 and 11' of the fixing plate 10' are disposed in a straight line parallel to the fixing grooves 12 and 12', and the two through holes 21 and 21' of the sliding plate 20' are also disposed in a straight line parallel to the wing section 23 to be inserted in the recess grooves 12 and 12'. That is, an imaginary straight line connecting the supporting protrusions 11 and 11' is in parallel to the fixing grooves 12 and 12', and the supporting protrusions 11 and 11' are disposed such that a distance is as great as possible. When the sliding plate 20' is moved up and down, therefore, an amount of deformation of the spring 50 or 50' becomes smaller, and thus, the life span of the spring 50 or 50' can be prolonged. Further, the one ends of the two springs 50 and 50' are pivotally fixed to the same side with respect to the fixing groove 13', and the other ends of the two springs are pivotally fixed to the same side with respect to the fixing groove 13. Therefore, when the sliding plate is slid, an elastic force of each spring is applied in only one direction. Consequently, since the wing section 23 of the sliding plate 20' is slid along the fixing groove 12 of the fixing plate 10' in a state where the former is brought into contact with the latter, it is possible to prevent the cover from shaking from side to side when the cover is slid.

Furthermore, until the center of the through hole 21 of the sliding plate 20' is coincident with the center of the supporting protrusion 111 of the fixing plate 10' after the sliding plate 20' has been moved, an elastic force of the spring 50 or 50' is applied in a direction in which the sliding motion of the sliding plate is hindered. Once the sliding plate has passed through a position where the through hole is coincident with the supporting protrusion, an elastic force of the spring 50 or 50' is applied in a direction in which the sliding motion of the sliding plate is promoted. Therefore, if a user wants to slide and open the cover, the user can merely apply a certain force to the cover only until the center of the through hole 21 of the sliding plate 20' is coincident with the center of the supporting protrusion 11 of the fixing plate 10', because the cover is then slid automatically by the elastic force of the springs 50 and 50'.

In a case where the respective plates of this embodiment are made of stainless steel, the holes for assembling the slider assembly or the through holes for supporting the ends of the springs can be manufactured at one time through the press working. Therefore, the manufacture can be easily made and the production costs can also be saved.

Further, the guide bushes prevent the wing sections of the sliding plate from wearing out and can be made of a wear resistant material with a low dynamic coefficient of friction; such as polyoxymethylene (POM), such that it can be used for a long time without frequent exchange. The dampers are preferably made of urethane rubber with an excellent shock-absorbing property such that they can absorb shock generated when the sliding plate is slid and prevent the shock from being transferred to the guide bushes and thus the guide bushes from being damaged.

Figure 20:
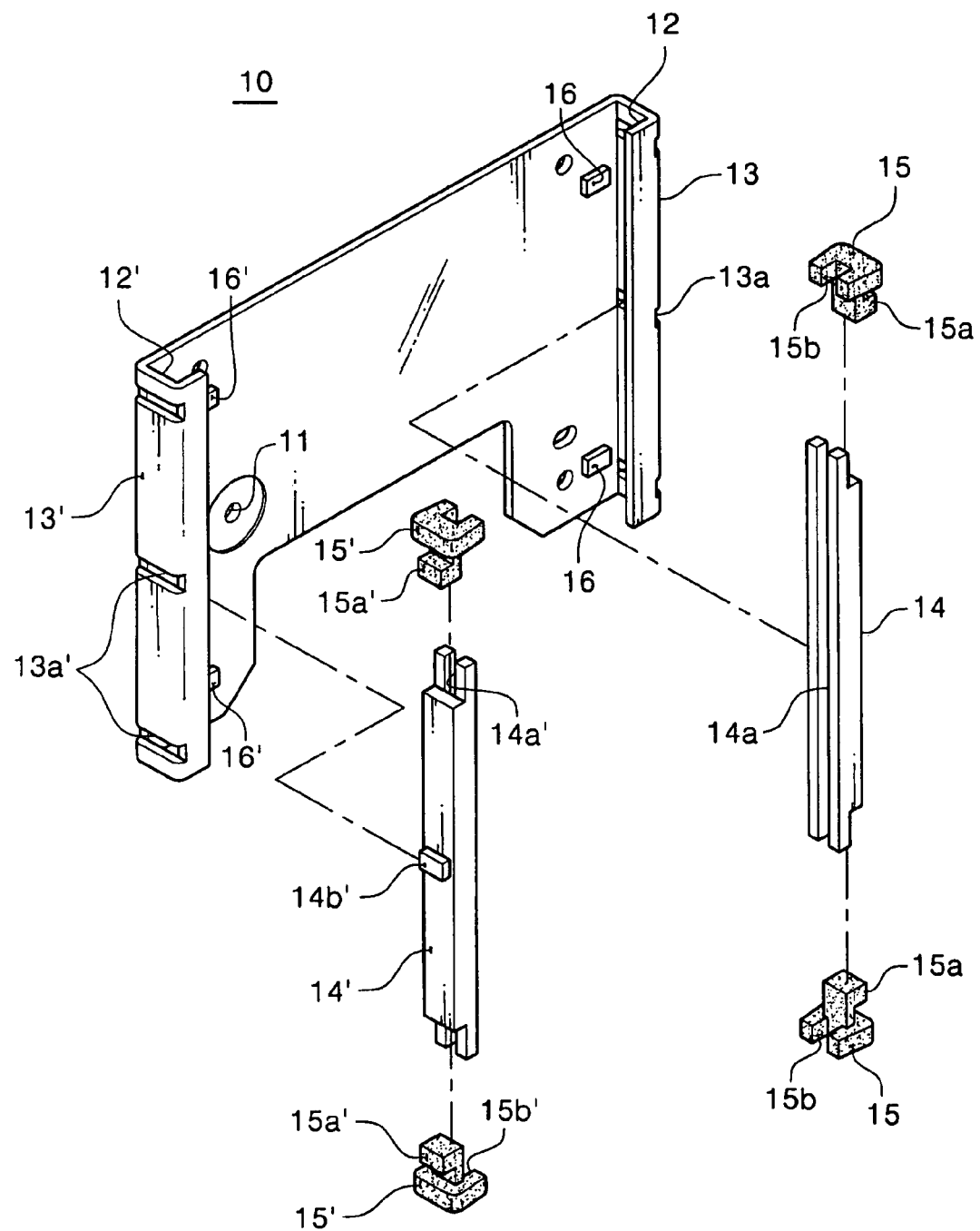
FIG. 20 is an exploded perspective view of a fixing plate in a slider assembly for a sliding-type cellular phone according to a ninth embodiment of the present invention.
Figure 21:
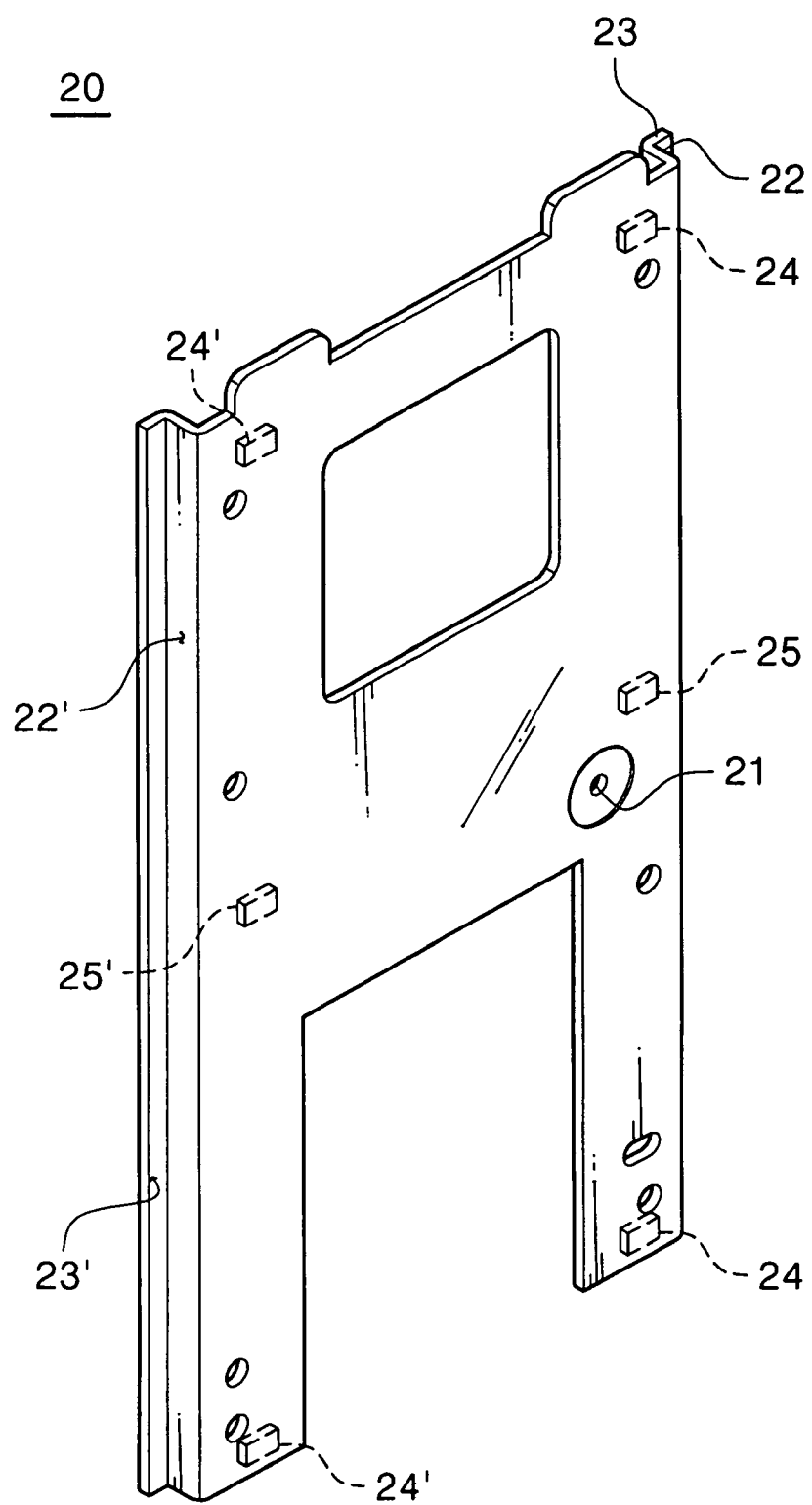
FIG. 21 is a perspective view of a sliding plate in the slider assembly for the sliding-type cellular phone according to the ninth embodiment of the present invention.
Figure 22:
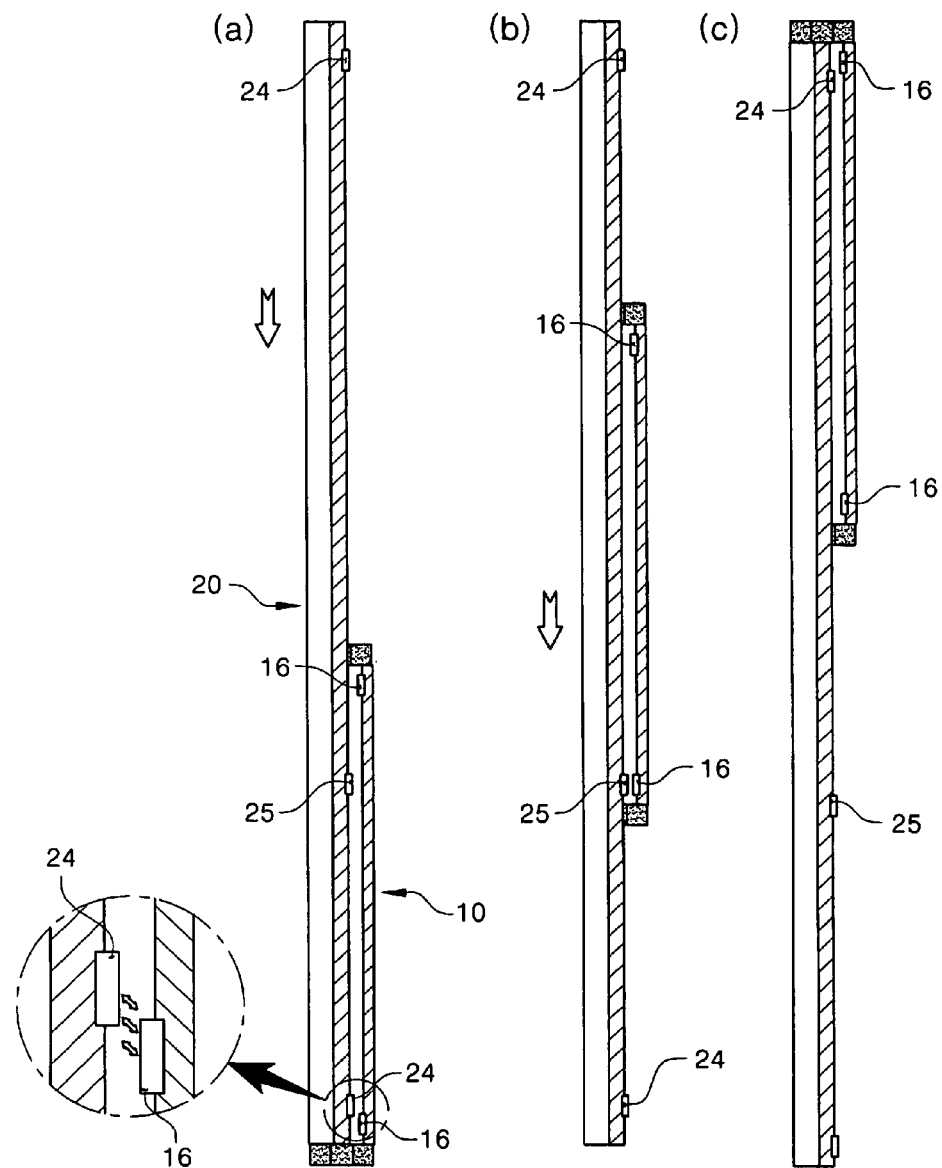
FIG. 22 is a sectional view of an up/down positioning means according to the ninth embodiment of the present invention, in which FIG. 22 (*a*) is a sectional view showing a state before the sliding plate is pushed in one direction, FIG. 22 (*b*) is a section view showing a state when a repulsive force between a third permanent magnet of the sliding plate and a first permanent magnet of the fixing plate is generated, and FIG. 22 (*c*) is a sectional view showing a state after the sliding plate has been pushed in one direction.
Figure 23:
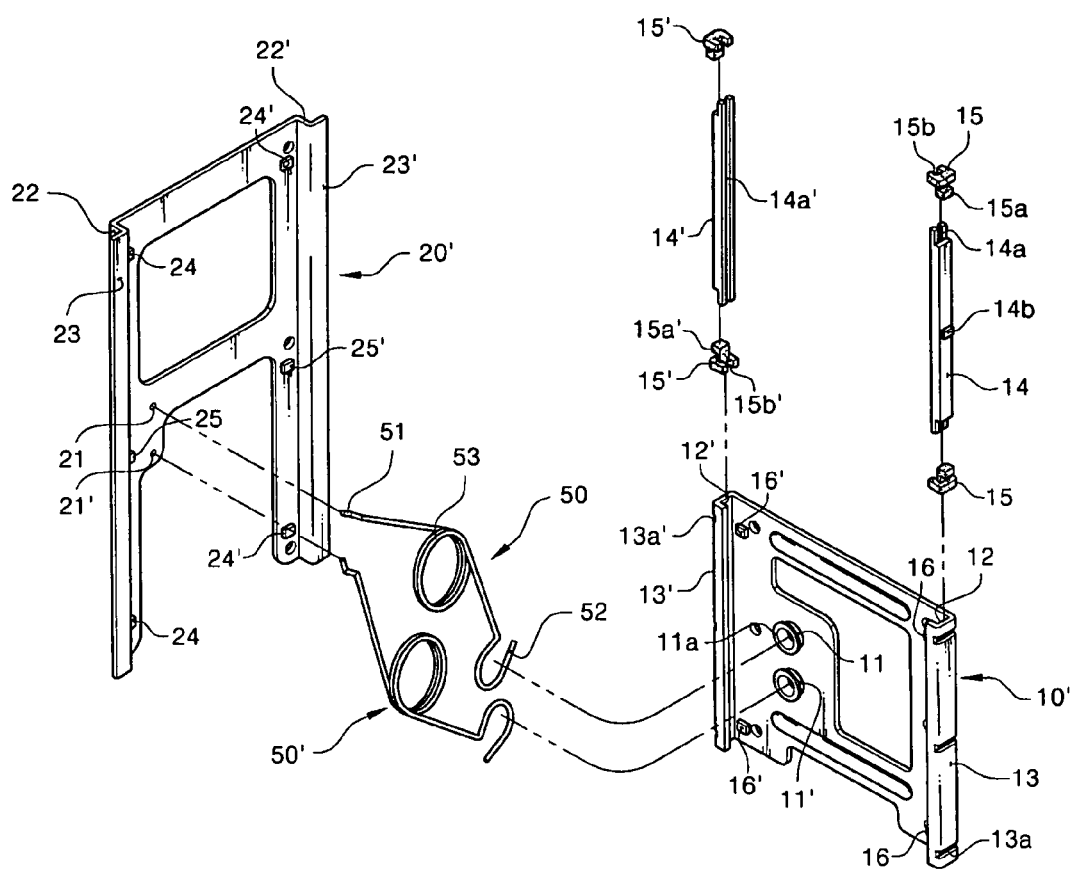
FIG. 23 is an exploded perspective view of a slider assembly for a sliding-type cellular phone according to a tenth embodiment of the present invention.
Figure 24:
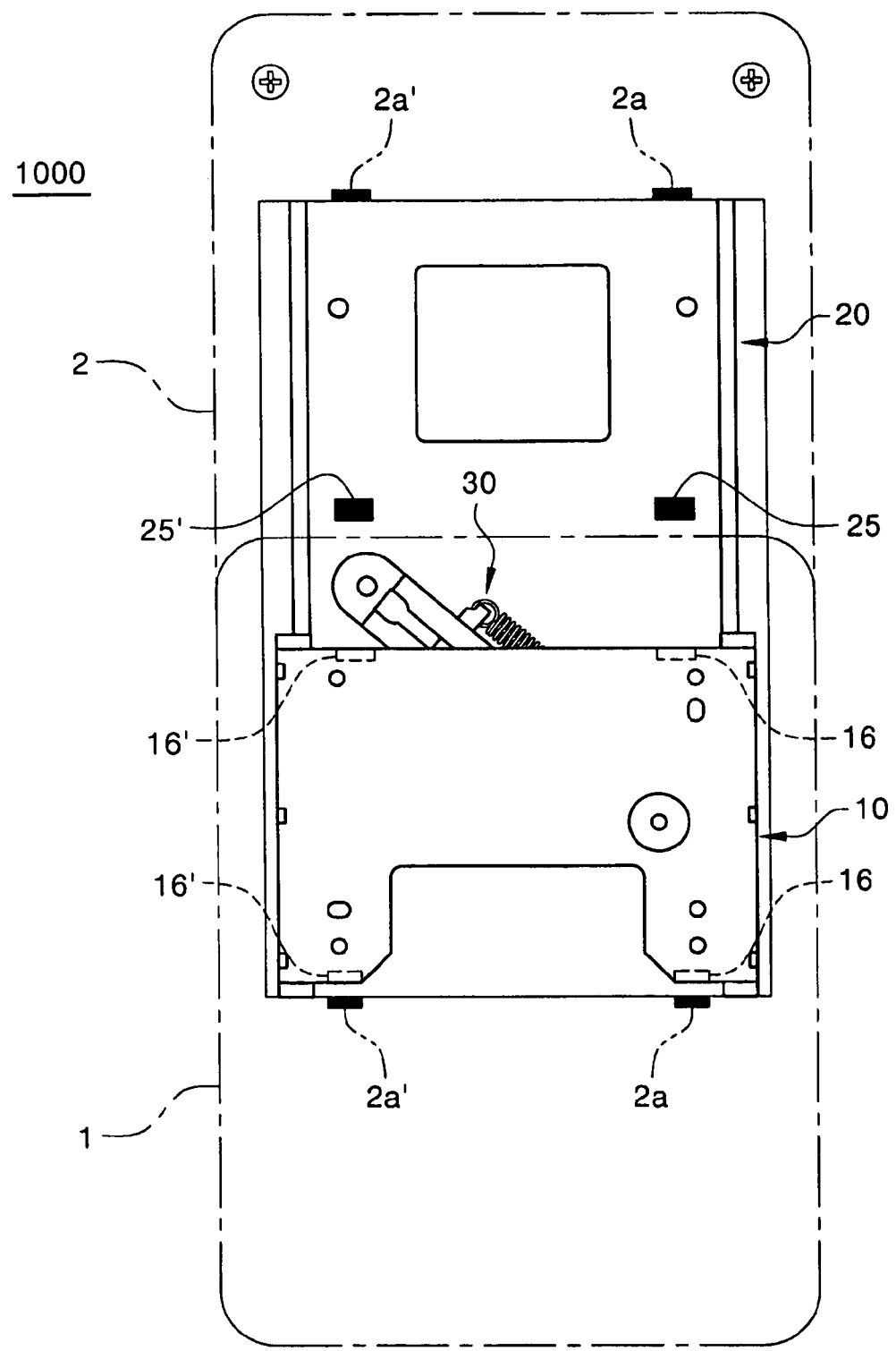
FIG. 24 is a bottom view of the sliding-type cellular phone with the slider assembly according to the ninth and tenth embodiments of the present invention installed therein.
Figure 25:
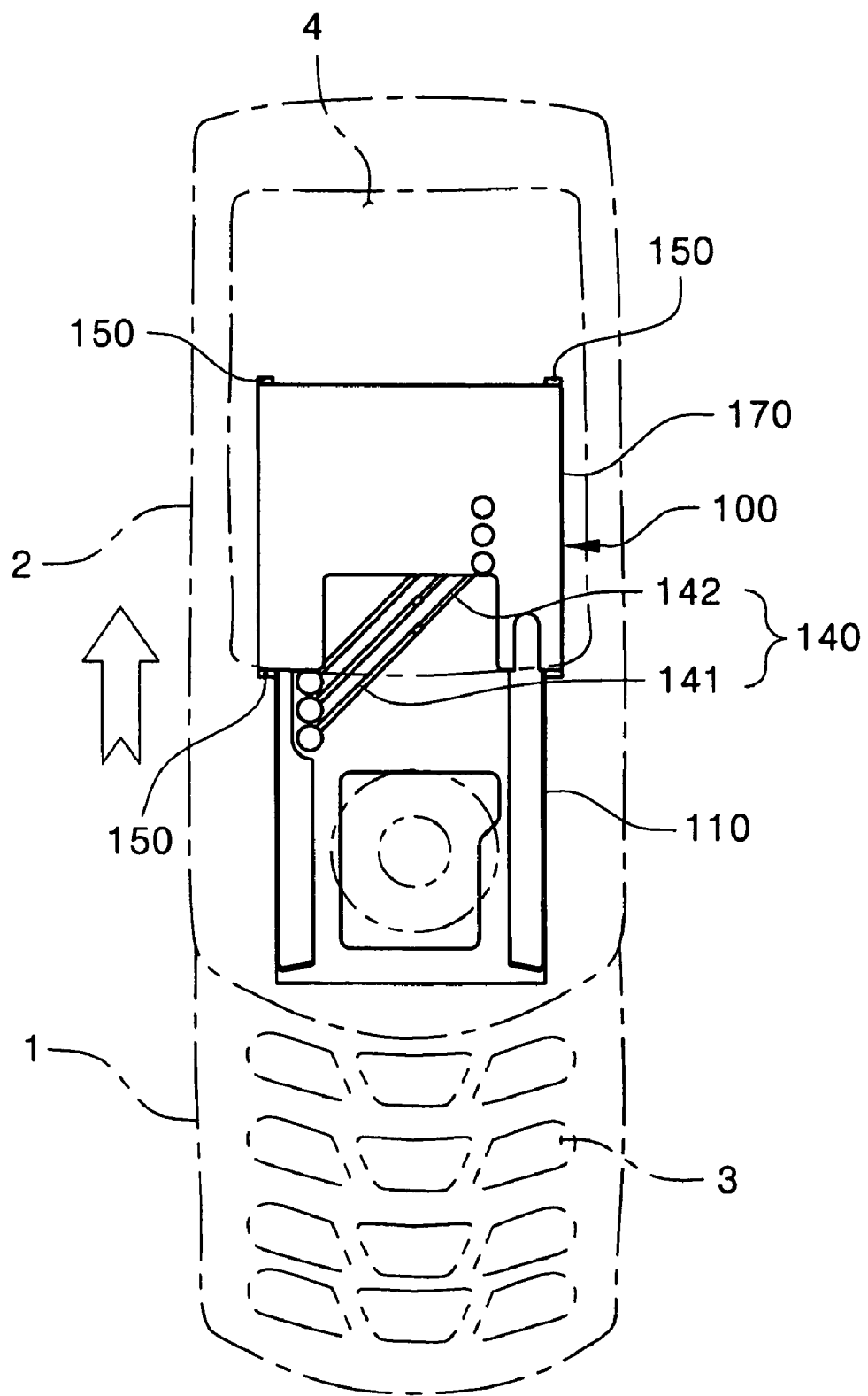
FIG. 25 is a schematic view of an exemplary slider assembly.

FIG. 20 is an exploded perspective view of a fixing plate of a slider assembly for the sliding-type cellular phone according to a ninth embodiment of the present invention; FIG. 21 is a perspective view of a sliding plate of the slider assembly for the sliding-type cellular phone according to the ninth embodiment of the present invention; FIG. 22 is a sectional view of an up/down positioning means according to the ninth embodiment of the present invention, in which FIG. 22 (*a*) is a sectional view showing a state before the sliding plate is pushed in one direction, FIG. 22 (*b*) is a section view showing a state when a repulsive force between a third permanent magnet of the sliding plate and a first permanent magnet of the fixing plate is generated, and FIG. 22 (*c*) is a sectional view showing a state after the sliding plate has been pushed in one direction; FIG. 23 is an exploded perspective view of a slider assembly for the sliding-type cellular phone according to a tenth embodiment of the present invention; and FIG. 24 is a bottom view of the sliding-type cellular phone with the slider assembly according to the ninth and tenth embodiments of the present invention installed therein.

The slider assembly for the sliding-type cellular phone according to this embodiment of the present invention comprises a fixing plate 10 formed with a guide section for guiding a linear motion of a sliding plate and fixed to an surface of a main body of the sliding-type cellular phone, a sliding plate 20 guided linearly by the guide section of the fixing plate 10 and fixed to an opposite surface of a cover of the cellular phone, and an up/down positioning means 30 including one end hinged to the fixing plate 10 and the other end hinged to the sliding plate 20 to change a direction of a force for pushing the sliding plate 20 from a specific sliding location of the sliding plate 20. Further, in order to prevent both sliding sides of the fixing plate 10 and sliding plate 20 from wearing out, guide bushes 14 and 14' are inserted and installed in fixing grooves 12 and 12' of the fixing plate 10, respectively.

FIG. 20 is an exploded perspective view of the fixing plate 10. Referring to this figure, each of both side sections 13 and 13' of the fixing plate 10 includes a pair of opposite and parallel fixing grooves 12 and 12' formed by twice bending a side portion of the fixing plate through the press working, and a plurality of through holes 13*a* and 13*a*' formed on the first bent side of the fixing grooves 12 and 12'. Further, a pair of first permanent magnets 16 or 16' are provided on predetermined positions of each of side ends of the fixing plate 10, and the fixing plate 10 is formed with a plurality of screw holes for fixing the fixing plate to the main body 1 of the cellular phone and a hinge hole 11 into which one end of the up/down positioning means 30 is fitted.

Each of the guide bushes 14 and 14' inserted respectively into the fixing grooves 12 and 12' in a longitudinal direction comprises a longitudinal guide groove 14*a* or 14*a*' for receiving the wing section 23 or 23' of the sliding plate 20 and guiding the sliding motion of the sliding plate, and a plurality of protrusions 14*b* or 14*b*' formed on a surface corresponding to the through holes 13*a* or 13*a*' of the fixing plate 10.

Each of dampers 15 and 15' installed at both longitudinal ends of the guide bushes 14 or 14' includes a protrusion 15 or 15' fixed in the though hole 13*a* or 13*a*' and protruding further from a longitudinal end of the fixing plate 10, and a guide groove 15*b* or 15*b*' for guiding the wing section 23 or 23' of the sliding plate 20. When the two dampers are installed at both ends of the guide bush 14 or 14', the guide groove 14*a* or 14*a* of the guide bush 14 or 14' and the guide groove 15*b* or 15*b*' of the damper 15 or 15' are aligned on the same line.

The guide bushes 14 and 14' prevent the fixing grooves of the fixing plate from wearing out due to friction with the wing sections 23 and 23' of the sliding plate 20 which are repeatedly slid and can be made of a wear resistant material with a low dynamic coefficient of friction such that it can be used for a long time without frequent exchange. Preferably, the guide bushes are made of polyoxymethylene (POM) that has been generally used. Further, the dampers 15 and 15' absorb shock generated when the sliding plate is slid and prevents the shock from being transferred to the guide bushes 14 and 14' and thus the guide bushes from being damaged. Preferably, the dampers 15 and 15' are made of urethane rubber with an excellent shock-absorbing property.

FIG. 21 is a perspective view of the sliding plate 20. Referring to this figure, the sliding plate 20 includes a plurality of screw holes used for fixing the sliding plate to the cover, a hinge hole 21 into which the other end of the up/down positioning means 30 is fitted, bent sections 22 and 22' formed at both lateral sides of the sliding plate by bending side portions of the sliding plate toward the fixing plate 10 using the press working, and wing sections 23 and 23' formed by additionally bending portions of the bent sections to extend outward. A pair of the wing section 23 and 23' are inserted into the guide grooves of the guide bush 14 and 14' and damper 15 and 15' installed in the fixing groove 12 and 12' of the fixing plate 10, respectively, such that the sliding plate can be slid up and down in a longitudinal direction.

Second permanent magnets 24 and 24' are installed at positions on the sliding plate 20 where the sliding plate 20 can be urged outward at the up/down position of the sliding plate 20 due to repulsive or attractive forces generated between the second permanent magnets and the first permanent magnets 16 and 16' installed at both ends of the fixing plate 10. Further, third permanent magnets 25 and 25' are installed at positions where a direction of an urging force of the sliding plate 20 slid along the fixing plate 10 is changed, such that repulsive or attractive forces are generated between the third permanent magnets and the first permanent magnets 16 and 16'.

In a case where the first permanent magnets 16 and 16' of the fixing plate 10 have N-polarity, the second permanent magnets 24 and 24' of the sliding plate 20 corresponding to the first permanent magnets can have N-polarity or S-polarity. If the second permanent magnets 24 and 24' have N-polarity, a repulsive force is generated between the first permanent magnets 16 and 16' and the second permanent magnets 24 and 24', and thus, the first and second permanent magnets repel each other. At this time, the first permanent magnets 16 and 16' of the fixing plate 10 is located at an outer side of the second permanent magnets 24 and 24' of the sliding plate 20.

On the other hand, if the second permanent magnets 24 and 24' have S-polarity, an attractive force is generated between the first and second permanent magnets, and thus, the first permanent magnets 16 and 16' and the second permanent magnets attract each other. At this time, the first permanent magnets 16 and 16' of the fixing plate 10 is located at an inner side of the second permanent magnets 24 and 24' of the sliding plate 20.

As described above, since a repulsive force is exerted when the polarities of the magnets of the fixing plate 10 and sliding plates 20 are the same as each other and an attractive force is exerted when the polarities of the magnets of the fixing plate and sliding plate are different from each other, the arrangement of the magnets can be made properly in various ways according to positions of the first permanent magnets 16 and 16' of the fixing plate 10 and the second permanent magnets 24 and 24' of the sliding plate 20.

The operation of the slider assembly of this embodiment will be described with reference to FIG. 22. FIG. 22 (a) shows a state where the fixing plate 20 (→10) is placed at a lower portion of the sliding plate 20. In such a state, the second permanent magnet 24 of the sliding plate 20 having N-polarity is located at an inner side of the first permanent magnet 16 of the fixing plate 10 having N-polarity, and thus, the repulsive force is generated between the first and second permanent magnets. Therefore, unless a certain force is applied downward to the sliding plate 20, the state shown in FIG. 22 is maintained because the first and second permanent magnets 16 and 24 repel each other.

As shown in FIG. 22 (b), if the sling plate 20 is pushed downward, the sliding plate 20 is moved by the up/down positioning means. At this time, while the sliding plate 20 is moved, it is stopped in a moment at a position (i.e., a dead zone) in which the direction of the urging force of the up/down positioning means is changed. In order to prevent this phenomenon from occurring, the third permanent magnet 25 is further installed at a position on the sliding plate 20, at which the dead zone is created, to generate a repulsive force between the first and third permanent magnets 16 and 25. Therefore, if the sliding plate 20 is pushed downward and then reaches near the position of the dead zone, the sliding plate 20 is smoothly moved at the dead zone in a direction in which the direction of the urging force is changed, due to a repulsive force generated between the third and first permanent magnets 25 and 16.

Furthermore, even though an attractive force is generated between the first and second permanent magnets 16 and 25 due to their polarity difference, the sliding plate can smoothly pass through the dead zone without stopping at the dead zone.

If the fixing plate 10 is placed at an upper portion of the sliding plate 20 that has passed through the dead zone as described above, a repulsive force is generated between the first permanent magnet 16 provided at an upper end of the fixing plate 10 and the second permanent magnet 24 provided at an upper end of the sliding plate 20. Therefore, unless a certain force is applied upward to sliding plate 20, a current state is maintained because the first and second permanent magnets 16 and 24 repel each other.

FIG. 23 is an exploded perspective view of a slider assembly for the sliding-type cellular phone according to the tenth embodiment of the present invention.

The slider assembly of this embodiment comprises a fixing plate 10' fixed to a main body of the cellular phone, a sliding plate 20' fixed to a cover, an up/down positioning means including one end hinged to the fixing plate 10' and the other end hinged to the sliding plate 20', and guide bushes 14 and 14' and dampers 15 and 15' for preventing sliding portions of the fixing plate 10' and sliding plate 20' from wearing out.

Further, first permanent magnets 16 and 16' are installed at both ends of the fixing plate 10', respectively, and second permanent magnets 24 and 24 are installed at positions on the sliding plate 20' where the sliding plate 20' can be urged outward due to repulsive or attractive forces generated between the second permanent magnets and the first permanent magnets 16 and 16'. In addition, third permanent magnets 25 and 25' are installed at certain positions on the sliding plate 20', near a position where the direction of an urging force of the up/down positioning means is changed while the sliding plate is moved, such that repulsive or attractive forces are generated between the third permanent magnets and any one pair of the first permanent magnets 16 and 16' of the fixing plate 10'.

Two supporting protrusions 11 and 11' are further formed on the fixing plate 10' in a straight line parallel to the fixing grooves 12 and 12'. Each of the supporting protrusions 11 and 11' is formed by the press working to protrude toward the sliding plate 20' and has a circular outer circumferential surface and an extended end portion 11a.

In the meantime, the guide bushes 14 and 14' and the dampers 15 and 15' inserted in the fixing grooves 12 and 12' in a longitudinal direction are the same as those described in the ninth embodiment.

Further, the sliding plate 20' includes first bent sections 22 and 22' that are formed on both sides of the sliding plate by bending a side portion of the sliding plate toward the fixing plate 10' through the press working, and wing sections 23 and 23' formed to extend outward by bending the first bending sections 22 and 22' once more. A pair of the wing sections 23 and 23' are fitted into the guide grooves of the guide bushes 14 and 14' and dampers 15 and 15', respectively, that are installed in the fixing grooves 12 and 12' of the fixing plate 10', respectively, such that the sliding plate can be slid up and down in a longitudinal direction. Further, the sliding plate 20' is formed with two through holes 21 and 21' in which one ends of the springs 50 and 50' are inserted such that the springs are hingedly supported. In addition, a plurality of screw holes are formed in the sliding plate 20' such that the sliding plate can be fixed to the cover.

Each of the two springs 50 and 50' serving as an up/down positioning means is a coil spring, made of steel wire, of which both ends are extended. A spring portion 53 formed by winding steel wire several times is formed at the center of the coil spring. One end 52 of the spring has a round shape such that it can surround a portion of the outer circumference of the circular supporting protrusion 11 of the fixing plate 10'. The other end 51 of the spring is bent first in a direction perpendicular to a plane defined by the circularly bent end 52 and then in a direction perpendicular to an extending direction of the first bent portion of the other end of the spring such that the second bent portion can be inserted in and pivoted on the through hole 21 of the sliding plate 20'.

The operation of the up/down positioning means 50 of this embodiment will be briefly explained. That is, the wing sections 23 and 23' formed at both sides of the sliding plate 20' are inserted in the respective guide grooves 14a, 14a', 15b and 15b' of the guide bushes 14 and 14' and dampers 15 and 15' installed in the fixing grooves 12 and 12' formed at both sides of the fixing plate 10', so that the sliding plate 20' can be slid up and down in a longitudinal direction along the guide grooves 14a, 14a', 15b and 15b'. Further, one end 52 of each of the two springs 50 surrounds a portion of the supporting protrusion 11 of the fixing plate 10' such that the spring can be pivoted with respect to the fixing plate, while the other end 51 of the spring is inserted in the through hole 21 of the sliding plate 20' such that the spring can be pivoted with respect to the sliding plate. Therefore, the sliding plate 20' is restricted by the springs 50 and 50' such that it is moved up and down within a predetermined distance.

In particular, the two supporting protrusions 11 and 11' of the fixing plate 10' are disposed in a straight line parallel to the fixing grooves 12 and 12', and the two through holes 21 and 21' of the sliding plate 20' are also disposed in a straight line parallel to the wing section 23 to be inserted in the recess grooves 12 and 12'. That is, an imaginary straight line connecting the supporting protrusions 11 and 11' is in parallel to the fixing grooves 12 and 12', and the supporting protrusions 11 and 11' are disposed such that a distance is as great as possible. When the sliding plate 20' is moved up and down, therefore, an amount of deformation of the spring 50 or 50' becomes smaller, and thus, the life span of the spring 50 or 50' can be prolonged. Further, the one ends of the two springs 50 and 50' are pivotally fixed to the same side with respect to the fixing groove 13', and the other ends of the two springs are pivotally fixed to the same side with respect to the fixing groove 13. Therefore, when the sliding plate is slid, an elastic force of each spring is applied in only one direction. Consequently, since the wing section 23 of the sliding plate 20' is slid along the fixing groove 12 of the fixing plate 10' in a state where the former is brought into contact with the latter, it is possible to prevent the cover from shaking from side to side when the cover is slid.

Furthermore, until the center of the through hole 21 of the sliding plate 20' is coincident with the center of the supporting protrusion 11 of the fixing plate 10' after the sliding plate 20' has been moved, an elastic force of the spring 50 or 50' is applied in a direction in which the sliding motion of the sliding plate is hindered. Once the sliding plate has passed through a position where the through hole is coincident with the supporting protrusion, an elastic force of the spring 50 or 50' is applied in a direction in which the sliding motion of the sliding plate is promoted. Therefore, if a user wants to slide and open the cover, the user can merely apply a certain force to the cover only until the center of the through hole 21 of the sliding plate 20' is coincident with the center of the supporting protrusion 11 of the fixing plate 10', because the cover is then slid automatically by the elastic force of the springs 50 and 50'.

Hereinafter, a sliding-type cellular phone including the above slider assembly will be described.

FIG. 24 is a bottom view of the sliding-type cellular phone including the slider assembly according to the ninth and tenth embodiments of the present invention. Referring to this figure, the sliding-type cellular phone 1000 comprises the slider assembly which includes a fixing plate 10 installed on a main body 1, a sliding plate 20 installed on a cover 2, and an up/down positioning means 30 for allowing the sliding plate 20 to be moved.

A pair of first permanent magnets 16 and 16' are installed at each of both ends of the fixing plate 10, and a pair of third permanent magnets 25 and 25' are installed at positions on the sliding plate 20 where a dead zone is created, such that a repulsive or attractive force is generated between the first permanent magnets 16 and 16' and the third permanent magnets 25 and 25'. Even in the dead zone, therefore, the sliding plate 20 can be smoothly and continuously moved in a direction in which the direction of an urging force of the up/down positioning means is changed.

Second permanent magnets 2a and 2a' are installed at both ends of the cover 2 of the cellular phone, at which the sliding plate 20 is installed, to face the first permanent magnets 16 and 16', such that an attractive force is generated between the first and second permanent magnets. That is, if the cover 2 of the cellular phone is pushed upward, the cover 2 is firmly kept stationary in a state where the cover has been opened, because an attractive force is generated between the first permanent magnets 16 and 16' provided at a lower end of the fixing plate 10 and the second permanent magnets 2 and 2' provided at a lower end of the cover 2 due to their polarity difference.

On the other hand, if the cover 2 of the cellular phone is pushed downward, the cover 2 is firmly kept stationary in a state where the cover is closed, because an attractive force is generated between the first permanent magnets 16 and 16' provided at an upper end of the fixing plate 10 and the second permanent magnets 2 and 2' provided at an upper end of the cover 2 of the cellular phone due to their polarity difference.

According to embodiments of the present invention so configured, since the up/down positioning means of the slider assembly can restrict a sliding length of the sliding plate, an additional stopper for restricting the sliding length needs not be installed on the main body or cover of the sliding-type cellular phone. Therefore, the manufacturing costs can be saved.

Since a tension spring are is used as an elastic means for maintaining an up/down state of the sliding plate instead of a torsion spring, the durability of the slider assembly can be improved. Further, it is possible to provide a cellular phone with more uniform urging force required for pushing the cover upward or downward as compared with a case where the torsion spring is used.

Since the sliding member with a low coefficient of friction is installed in the guide groove of the sliding plate that is slid along the fixing plate, the durability of the sliding plate can be improved and sliding noise can also be reduced. In addition, since the spring engaging section is formed to prevent the up/down positioning means from interfering with the flexible printed circuit board mounted within the cellular phone, any inconvenience due to the malfunction of the cellular phone can be eliminated and the cellular phone can be used for a long time.

In addition, the manufacturing costs and working hour can be saved and the productivity can also be enhanced by providing the slider assembly including a fixing plate and a sliding plate which are manufactured through the press working such that there is no need for additional machining processes for the next assembly.

According to embodiments of the present invention, there is an advantage in that the durability can be improved and the sliding noise can also be reduced, since the sliding member with a low coefficient of friction is installed in the fixing groove of the fixing plate that is slid along the sliding plate.

Since the slider assembly is configured such that an amount of deformation of the spring is minimized when the sliding plate is slid up and down, the expected life span of the spring can be prolonged. Further, since the respective fixing and sliding plates are made of stainless steel, the plates cannot be easily damaged from shock, whereby the durability can also be increased.

Since a shock-absorbing member made of a soft material is further installed at both ends of the guide bushes, the guide buses are not broken due to shock generated when the cover of the cellular phone is opened or closed or when the cellular phone is dropped. Thus, the cellular phone can be used for a long time and incidental expenses can be saved. Further, since the sliding plate installed on the cover of the cellular phone is brought into contact with the shock-absorbing member rather than the fixing plate even though the cover with the sliding plate installed thereon is frequently slid, noise due to the shock is not generated.

According to embodiments of the present invention, since the permanent magnets are further installed at predetermined positions on the sliding plate to correspond to the permanent magnets installed on the fixing plate, the sliding plate can be smoothly and continuously slid up and down. Further, since a plurality of permanent magnets are installed at both ends of the fixing plate and sliding plate to generate an attractive or repulsive force between the magnets, the cover of the cellular phone can be firmly kept at its up or down state even though the spring in the up/down positioning means is weakened.

What is claimed is:

1. A handheld electronic device comprising:
a first panel;
a second panel slidable with respect to the first panel;
a first slider secured to the first panel,
a second slider secured to the second panel, wherein the second slider is slidably engaged with the first slider and slidable relative to the first slider;
a link assembly linking between the first and second sliders, the link assembly comprising:
a first link member comprising a first pivot end and a first opposing end, the first link member being pivotally connected to the first slider at or near the first pivot end,
a second link member comprising a second pivot end, and a second opposing end, the second link member being pivotally connected to the second slider at or near the second pivot end, wherein the first and second link members are engaged with each other such that sliding of the first slider relative to the second slider causes linear sliding of the first link member relative to the second link member and further causes a swivel movement of the first link member relative to the first slider and a swivel movement of the second link member relative to the second slider, and
a spring interconnecting the first and second link members and configured to apply resilient force as the first and second link members slide relative to each other; and
wherein the second slider is movable relative to the first slider between a first relative position and a second relative position, wherein the link assembly is configured to exert force on the second slider to spontaneously move toward the first relative position when the second slider is located between the first and second relative positions.

2. The device of claim 1, wherein the spring interconnects between a first spring connection portion of the first link member and a second spring connection portion of the second link member, wherein the first spring connection portion is closer to the second pivot end than to the first pivot end.

3. The device of claim 1, wherein the first and second link members are engaged with each other such that the second opposing end is slidable between the first pivot end and the first opposing end.

4. The device of claim 1, wherein the first and second link members are engaged such that the spring becomes pulled as the first opposing end gets closer to the second pivot end.

5. The device of claim 1, wherein the first and second pivot ends define a first distance therebetween, wherein the first and second opposing ends define a second distance therebetween, wherein the link assembly is configured such that the second distance decreases when the first distance increases.

6. The device of claim 5, wherein the spring is configured to apply force between the first and second link members such that the first link member spontaneously moves relative to the second link member to make the second distance larger.

7. The device of claim 1, wherein the spring comprises a tension coil spring.

8. The device of claim 1, wherein each of the first and second link members comprises a body and an arm extending from the body, wherein the bodies of the first and second link members are slidably engaged with each other, wherein the spring interconnects between the arms of the first and second link members.

9. The device of claim 1, wherein each of the first and second link members comprises a body and first and second arms extending from the body, wherein the bodies of the first and second link members are slidably engaged with each other, wherein the spring interconnects between the first arms of the first and second link members, wherein the device further comprises an additional spring that interconnects between the second arms of the first and second link members.

10. The device of claim 1, wherein the second slider is movable relative to the first slider between the second relative position and a third relative position, wherein the link assembly is further configured to exert force on the second slider to spontaneously move toward the third relative position when the second slider is located between the second and third relative positions.

11. The device of claim 10, wherein the first and second opposing ends define a second distance therebetween, wherein the second distance at the second relative position is smaller than the second distance at any one of the first and third relative positions.

12. The device of claim 1, wherein the first slider comprises a rail, and wherein the second slider comprises a guide groove configured to slidably engage with the rail.

13. The device of claim 1, wherein the first link member comprises a guide rail elongated in a direction extending from the first pivot end toward the second pivot end, wherein the guide rail is configured to guide sliding of the second link member relative to the first link member in the direction.

14. The device of claim 1, wherein the device comprises a portable electronic device selected from the group consisting of a wireless internet device, a mobile phone, a wireless email receiver, a radio receiver, a television receiver, a calculator, an electronic dictionary or encyclopedia, a PDA and a hand-held computer.

15. The device of claim 1, wherein the first and second link members are engaged to each other such that the first link member is linearly slide relative to the second link member.

16. A sliding device for use in a handheld electronic device comprising a first panel and a second panel slidable with respect to the first panel, the sliding device comprising:
a first slider configured to be secured to the first panel;
a second slider configured to be secured to the second panel, wherein the second slider is slidably engaged with the first slider and slidable relative to the first slider;
a link assembly linking between the first and second sliders, the link assembly comprising:
a first link member comprising a first pivot end and a first opposing end, the first link member being pivotally connected to the first slider at or near the first pivot end,
a second link member comprising a second pivot end and a second opposing end, the second link member being pivotally connected to the second slider at or near the second pivot end, wherein the first and second link members are engaged with each other such that sliding of the first slider relative to the second slider causes linear sliding of the first link member relative to the second link member and further causes a swivel movement of the first link member relative to the first slider and a swivel movement of the second link member relative to the second slider, and a spring interconnecting the first and second link members and configured to apply resilient force as the first and second link members slide relative to each other, and wherein the second slider is movable relative to the first slider between a first relative position and a second relative position, wherein the link assembly is configured to exert force on the second slider to spontaneously move toward the first relative position when the second slider is located between the first and second relative positions.

17. The device of claim 16, wherein the spring interconnects between a first spring connection portion of the first link member and a second spring connection portion of the second link member, wherein the first spring connection portion is closer to the second pivot end than to the first pivot end.

18. The device of claim 16, wherein the first and second link members are engaged with each other such that the second opposing end is slidable between the first pivot end and the first opposing end.

19. The device of claim 16, wherein the first and second link members are engaged such that the spring becomes pulled as the first opposing end gets closer to the second pivot end.

20. The device of claim 16, wherein the first and second pivot ends define a first distance therebetween, wherein the first and second opposing ends define a second distance therebetween, wherein the link assembly is configured such that the second distance decreases when the first distance increases.

21. The device of claim 20, wherein the spring is configured to apply force between the first and second link members such that the first link member spontaneously moves relative to the second link member to make the second distance larger.

22. The device of claim 16, wherein the spring comprises a tension coil spring.

23. The device of claim 16, wherein each of the first and second link members comprises a body and an arm extending from the body, wherein the bodies of the first and second link members are slidably engaged with each other, wherein the spring interconnects between the arms of the first and second link members.

24. The device of claim 16, wherein the first and second link members are engaged to each other such that the first link member is linearly slide relative to the second link member.

* * * * *